US012712695B2

(12) United States Patent
Li et al.

(10) Patent No.: US 12,712,695 B2
(45) Date of Patent: Aug. 18, 2026

(54) COMMUNICATION METHOD AND APPARATUS FOR REDUCING A RETRANSMISSION PROCESS DELAY

(71) Applicant: HUAWEI TECHNOLOGIES CO., LTD., Shenzhen (CN)

(72) Inventors: Shengyu Li, Beijing (CN); Lei Guan, Beijing (CN); Yiling Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 552 days.

(21) Appl. No.: 17/987,420

(22) Filed: Nov. 15, 2022

(65) Prior Publication Data

US 2023/0084145 A1 Mar. 16, 2023

Related U.S. Application Data

(63) Continuation of application No. PCT/CN2021/091926, filed on May 6, 2021.

(30) Foreign Application Priority Data

May 20, 2020 (CN) ......................... 202010432175.5

(51) Int. Cl.
*H04L 5/00* (2006.01)
*H04W 72/0446* (2023.01)
(Continued)

(52) U.S. Cl.
CPC ....... *H04L 5/0055* (2013.01); *H04W 72/0446* (2013.01); *H04W 72/0453* (2013.01); *H04W 72/23* (2023.01)

(58) Field of Classification Search
CPC ................ H04L 5/0055; H04W 72/23; H04W 72/0446; H04W 72/0453
See application file for complete search history.

(56) References Cited

U.S. PATENT DOCUMENTS 10,638,385 B2 4/2020 Baek et al.
2012/0257519 A1* 10/2012 Frank ...................... H04L 5/143 370/252

(Continued)

FOREIGN PATENT DOCUMENTS

CN 110383878 A 10/2019
CN 110830151 A 2/2020

(Continued)

OTHER PUBLICATIONS

Extended European Search Report issued in corresponding European Application No. 21808091.9, dated Sep. 22, 2023, pp. 1-4.

(Continued)

*Primary Examiner* — Michael Thier
*Assistant Examiner* — Nevena Zecevic Sandhu
(74) *Attorney, Agent, or Firm* — HAUPTMAN HAM, LLP

(57) ABSTRACT

A communication method and apparatus to reduce a waiting latency in a retransmission process. A terminal device receives a first PDSCH from a network device. In response to failing to decode data carried on the first PDSCH, the terminal device sends an SRS to the network device on a first time-frequency resource. In response to the network device not receiving feedback information of the first PDSCH, or receiving feedback information of the first PDSCH that is a NACK, the network device retransmits the first PDSCH based on a result of measuring the SRS. After determining that the first PDSCH fails to be decoded, the terminal device directly sends the SRS to the network device by using the first time-frequency resource.

20 Claims, 9 Drawing Sheets

(51) Int. Cl.
*H04W 72/0453* (2023.01)
*H04W 72/23* (2023.01)

(56) References Cited

U.S. PATENT DOCUMENTS

| | | | |
|---|---|---|---|
| 2018/0070313 A1 | 3/2018 | Papasakellariou et al. | |
| 2019/0199555 A1 | 6/2019 | Munier et al. | |
| 2020/0228173 A1* | 7/2020 | Ye | H04L 5/0055 |
| 2022/0210612 A1* | 6/2022 | Keating | G01S 11/02 |
| 2023/0081792 A1* | 3/2023 | Kim | H04L 1/1864 370/329 |

FOREIGN PATENT DOCUMENTS

| | | |
|---|---|---|
| WO | 2017038337 A1 | 3/2017 |
| WO | 2020049736 A1 | 3/2020 |

OTHER PUBLICATIONS

International Search Report issued in corresponding International Application No. PCT/CN2021/091926, dated Jul. 26, 2021, pp. 1-9.

* cited by examiner

COMMUNICATION METHOD AND APPARATUS FOR REDUCING A RETRANSMISSION PROCESS DELAY

CROSS-REFERENCE TO RELATED APPLICATIONS

This application is a continuation of International Application No. PCT/CN2021/091926, filed on May 6, 2021, which claims priority to Chinese Patent Application No. 202010432175.5, filed on May 20, 2020. The disclosures of the aforementioned applications are hereby incorporated by reference in their entireties.

TECHNICAL FIELD

This application relates to the field of communication technologies, and in particular, to a communication method and apparatus.

BACKGROUND

An ultra-reliable low-latency communication (ultra-reliable low-latency communication, URLLC) service is defined in $5^{th}$ generation ($5^{th}$ generation, 5G) mobile communication. An uplink or downlink end-to-end transmission latency of the URLLC service may reach 0.5 milliseconds (ms). In the future, the URLLC service will be mainly used in fields such as smart factories, autonomous driving, human-computer interaction, and telemedicine. To ensure high reliability of URLLC service data transmission, reference may be made to a hybrid automatic repeat request (hybrid automatic repeat request, HARQ) technology.

A physical downlink shared channel (physical downlink shared channel, PDSCH) carrying data is used as an example. A network device sends the PDSCH to a terminal device, and the terminal device receives the PDSCH. The PDSCH may carry the URLLC service. If the terminal device successfully decodes the data carried on the PDSCH, the terminal device needs to send an acknowledgement (acknowledgement, ACK) to the network device. However, if the terminal device fails to decode the data carried on the PDSCH, the terminal device needs to send a negative acknowledgement (negative acknowledgement, NACK) to the network device.

If the network device receives the NACK from the terminal device, the network device determines that the terminal device fails in decoding. In this case, the network device may schedule the terminal device to send a sounding reference signal (sounding reference signal, SRS), and the terminal device sends the SRS to the network device based on scheduling of the network device. The network device performs channel quality measurement on the SRS, and schedules the retransmitted PDSCH by using downlink control information (downlink control information, DCI) based on channel quality obtained through measurement. It may be learned that, from a moment at which the network device determines that the terminal device fails in decoding to a moment at which the network device sends retransmitted data, a retransmission waiting latency for scheduling the SRS by the network device is additionally introduced. Consequently, a low-latency communication requirement of the URLLC service cannot be met.

SUMMARY

Embodiments of this application provide a communication method and apparatus, to reduce a retransmission waiting latency.

According to a first aspect, this application provides a communication method. The method may be performed by a terminal device, or may be performed by a chip or a chip system in the terminal device. The following provides descriptions by using an example in which the method is performed by the terminal device. The terminal device receives a first PDSCH from a network device. When failing to decode data carried on the first PDSCH, the terminal device sends an SRS to the network device on a first time-frequency resource; and/or when successfully decoding data carried on the first PDSCH, the terminal device sends feedback information of the first PDSCH to the network device, where the feedback information includes acknowledgement information.

In a possible design, when failing to decode the data carried on the first PDSCH, the terminal device sends the SRS to the network device on the first time-frequency resource, and the method further includes: The terminal device sends feedback information of the first PDSCH, where the feedback information includes negative acknowledgement information.

In a possible design, when failing to decode the data carried on the first PDSCH, the terminal device sends the SRS to the network device on the first time-frequency resource, and the method further includes: The terminal device skips sending feedback information of the first PDSCH. Further, when successfully decoding the data carried on the first PDSCH, the terminal device does not send the SRS or the feedback information of the first PDSCH. In this manner, regardless of whether the terminal device successfully decodes or fails to decode the data carried on the first PDSCH, the terminal device may not send the feedback information of the first PDSCH to the network device, to reduce network overheads and improve resource utilization.

In the foregoing technical solution, when failing to decode the data carried on the first PDSCH, the terminal device may send the SRS to the network device by using the first time-frequency resource, so that the network device can determine, by monitoring whether the terminal device sends the SRS, a result of decoding the first PDSCH by the terminal device, and the network device can adjust a retransmission parameter of the first PDSCH based on a result of measuring the SRS. In this way, a success probability of retransmitting the first PDSCH is increased and resource utilization efficiency is improved. In the foregoing technical solution, after failing to decode the first PDSCH, the terminal device directly sends the SRS to the network device by using the first time-frequency resource, to reduce an interaction procedure, in the conventional technology, from a moment at which the terminal device fails to decode the first PDSCH to a moment at which the terminal device sends the SRS to the network device. Therefore, in the foregoing technical solution, in addition to improving communication reliability, a communication latency is reduced, thereby reducing air interface resources. Further, when successfully decoding the data carried on the first PDSCH, the terminal device may choose to feed back acknowledgement information to the network device, so that the network device that receives the acknowledgement information can determine that the terminal device successfully decodes the first PDSCH; or the terminal device may choose not to send the feedback information or the SRS to the network device. In this manner, it is implicitly indicated that the first PDSCH is successfully decoded, and does not need to be retransmitted.

In a possible design, when the data carried on the first PDSCH is successfully decoded, the method further includes: The terminal device skips sending the SRS to the network device on the first time-frequency resource. In this manner, when failing to decode the data carried on the first PDSCH, the terminal device sends the SRS on the first time-frequency resource; otherwise, the terminal device does not send the SRS on the first time-frequency resource. In this manner, only a terminal device that fails to receive data sends the SRS. In this way, the network device may allocate some time-frequency resources to a plurality of terminal devices, to improve utilization efficiency of a time-frequency resource for carrying the SRS. Further, the network device may use, as a basis for determining whether the terminal device successfully decodes the first PDSCH, whether the SRS is detected on the first time-frequency resource. In this manner, the network device may not need to monitor the feedback information of the first PDSCH, but directly monitor the SRS on the first time-frequency resource, to determine a result of decoding the first PDSCH by the terminal device, so that overheads of air interface resources can be reduced. For example, if the network device detects the SRS on the first time-frequency resource, the network device may determine that the terminal device fails to decode the data carried on the first PDSCH. If the network device does not detect the SRS on the first time-frequency resource, the network device may determine that the terminal device successfully decodes the data carried on the first PDSCH.

In a possible design, the SRS may be an aperiodic SRS, and the method further includes: The terminal device receives first DCI from the network device, where the first DCI indicates the first time-frequency resource. In this manner, after the terminal device fails to decode data carried on a received PDSCH, the network device does not need to temporarily schedule the aperiodic SRS, and the terminal device may send the aperiodic SRS to the network device by using the first time-frequency resource indicated by the first DCI, to reduce an interaction procedure from a moment at which the terminal device fails to decode the data carried on the received PDSCH to a moment at which the terminal device sends the SRS to the network device, and reduce a communication latency.

In a possible design, the first DCI is further used to schedule the first PDSCH. In this manner, the network device may simultaneously schedule the aperiodic SRS and the first PDSCH by using one piece of DCI, to reduce overheads of air interface resources.

In a possible design, the first time-frequency resource is the same as a time-frequency resource used to carry the feedback information of the first PDSCH. Alternatively, the first time-frequency resource and the time-frequency resource for carrying the feedback information of the first PDSCH are indicated by a same field in the first DCI. In this manner, the first time-frequency resource may be used to carry the SRS, or may be used to carry the feedback information of the first PDSCH. For example, if the terminal device fails to decode the first PDSCH, the terminal device may send the SRS to the network device by using the first time-frequency resource, and not send the feedback information of the first PDSCH. If the terminal device successfully decodes the first PDSCH, the terminal device may send the feedback information of the first PDSCH to the network device by using the first time-frequency resource, and not send the SRS. That is, the network device does not need to separately configure time-frequency resources carrying the SRS and the feedback information of the first PDSCH, to improve utilization of the time-frequency resources.

In a possible design, the method further includes: The terminal device receives first indication information from the network device, where the first indication information indicates a frequency domain resource of the first time-frequency resource; and the terminal device determines a first time domain resource, the first time domain resource is a time domain resource of the first time-frequency resource, and there is a first correspondence between the first time domain resource and a second time domain resource, where the second time domain resource is a time domain resource occupied by the first PDSCH, a time domain resource occupied by the feedback information of the first PDSCH, or a time domain resource occupied by second DCI, and the second DCI is used to schedule the first PDSCH. In this manner, when the terminal device fails to decode the data carried on the first PDSCH, the terminal device may determine the time domain resource of the first time-frequency resource based on the time domain resource occupied by the first PDSCH, the time domain resource occupied by the feedback information of the first PDSCH, or the time domain resource occupied by the second DCI, and then determine the first time-frequency resource with reference to the frequency domain resource that is of the first time-frequency resource and that is indicated by the network device, to send the SRS to the network device by using the first time-frequency resource. The time domain resource of the first time-frequency resource is related to the time domain resource occupied by the first PDSCH, the time domain resource occupied by the feedback information of the first PDSCH, or the time domain resource occupied by the second DCI, and the terminal device may determine the time domain resource of the first time-frequency resource based on the time domain resource occupied by the first PDSCH, the time domain resource occupied by the feedback information of the first PDSCH, or the time domain resource occupied by the second DCI. Therefore, the network device does not need to indicate the time domain resource of the first time-frequency resource to the terminal device, so that overheads of the indication information are reduced, and air interface resources can be reduced.

In a possible design, the first correspondence includes at least one of the following correspondences: a correspondence between a start symbol of the first time domain resource and an end symbol of the second time domain resource; a correspondence between a number of a time unit in which the first time domain resource is located and a number of a time unit in which the second time domain resource is located; or a number of a time unit in which the first time domain resource is located being the same as a number of a time unit in which the second time domain resource is located. In this manner, because a symbol location of the second time domain resource or a location of the time unit in which the second time domain resource is located implicitly indicates the first time domain resource, the terminal device may determine the first time domain resource based on the symbol location of the second time domain resource or the location of the time unit in which the second time domain resource is located.

In a possible design, the number of the time unit in which the first time domain resource is located is the same as the number of the time unit in which the second time domain resource is located. A symbol location of the first time domain resource in the time unit may be indicated by the network device, for example, indicated by using radio resource control (radio resource control, RRC) signaling.

In a possible design, the correspondence between the start symbol of the first time domain resource and the end symbol of the second time domain resource includes: a distance between the start symbol of the first time domain resource and the end symbol of the second time domain resource being a first value. For example, the second time domain resource is a time domain resource occupied by the first PDSCH, and the first value is minimum processing time from a moment at which the terminal device receives a PDSCH to a moment at which the terminal device sends corresponding feedback information, or the first value is a sum of a first offset value and minimum processing time from a moment at which the terminal device receives a PDSCH to a moment at which the terminal device sends corresponding feedback information. The minimum processing time from the moment at which the terminal device receives the PDSCH to the moment at which the terminal device sends the corresponding feedback information may be predefined, configured by using higher layer signaling, or specified in a protocol. The first offset value may be predefined, configured by using higher layer signaling, or specified in a protocol.

In a possible design, a distance between the start symbol of the first time domain resource and the end symbol of the second time domain resource is a first value, and a length of the first time domain resource may be predefined, or indicated by the network device, for example, indicated by higher layer signaling sent by the network device to the terminal device.

In a possible design, the correspondence between the number of the time unit in which the first time domain resource is located and the number of the time unit in which the second time domain resource is located includes: a difference between the number of the time unit in which the first time domain resource is located and the number of the time unit in which the second time domain resource is located being a second value. In this case, a symbol location of the first time domain resource in the time unit may be indicated by the network device, for example, indicated by the network device by using RRC signaling.

In a possible design, the SRS may be a periodic SRS, and the method further includes: The terminal device receives first configuration information from the network device, where the first configuration information is used to determine a transmission periodicity of the periodic SRS and a first time-frequency resource set for carrying the periodic SRS, the first time-frequency resource is the 1st time-frequency resource that is in the first time-frequency resource set and whose start moment is not earlier than a start moment of a symbol S1, and the symbol S1 is the 1st symbol after a first time length starting from an end moment of a second time domain resource, where the second time domain resource is a time domain resource occupied by the first PDSCH, a time domain resource occupied by the feedback information of the first PDSCH, or a time domain resource occupied by second DCI, and the second DCI is used to schedule the first PDSCH. For example, the second time domain resource is a time domain resource occupied by the first PDSCH, and the first time length is minimum processing time from a moment at which the terminal device receives a PDSCH to a moment at which the terminal device sends corresponding feedback information, or the first time length is a sum of a second offset value and minimum processing time from a moment at which the terminal device receives a PDSCH to a moment at which the terminal device sends corresponding feedback information. The minimum processing time from the moment at which the terminal device receives the PDSCH to the moment at which the terminal device sends the corresponding feedback information may be predefined or configured by using higher layer signaling. The second offset value may be predefined or configured by using higher layer signaling. In this manner, the terminal device may first determine the transmission periodicity of the periodic SRS and the first time-frequency resource set based on the received first configuration information, where a time-frequency resource included in the first time-frequency resource set is used to carry the periodic SRS. After the terminal device fails to decode data carried on a received PDSCH, the terminal device may select the first time-frequency resource from the first time-frequency resource set to carry the periodic SRS, to reduce an interaction procedure from a moment at which the terminal device fails to decode the data carried on the received PDSCH to a moment at which the terminal device sends the SRS to the network device, reduce air interface resources, and reduce a communication latency. In addition, the first time-frequency resource is the 1st time-frequency resource that is in the first time-frequency resource set and whose first start moment is not earlier than the start moment of the symbol S1. This may ensure that, before sending the SRS, the terminal device can complete receiving and decoding the first PDSCH and determining a result of decoding the first PDSCH.

According to a second aspect, an embodiment of this application provides a communication method. The method may be performed by a network device, or may be performed by a chip or a chip system in the network device. The following provides descriptions by using an example in which the method is performed by the network device. The network device sends a first PDSCH to a terminal device, and receives an SRS from the terminal device on a first time-frequency resource.

In a possible design, that the network device receives an SRS from the terminal device on a first time-frequency resource includes: When the network device receives feedback information of the first PDSCH from the terminal device, and the feedback information is a NACK, the network device receives the SRS from the terminal device on the first time-frequency resource; and/or when the network device does not receive feedback information of the first PDSCH from the terminal device, the network device receives the SRS from the terminal device on the first time-frequency resource.

In a possible design, that the network device receives an SRS from the terminal device on a first time-frequency resource further includes: When the SRS from the terminal device is not detected on the first time-frequency resource, the network device may directly determine that the first PDSCH is correctly decoded. When the SRS from the terminal device is detected on the first time-frequency resource, the network device may alternatively determine that the first PDSCH is not correctly decoded. In other words, the network device determines, based on whether the SRS is detected on the first time-frequency resource, whether the terminal device correctly decodes the first PDSCH. In this way, time-frequency resources required for sending the feedback information of the first PDSCH by the terminal device to the network device can be reduced, thereby reducing overheads of air interface resources.

In a possible design, the SRS may be an aperiodic SRS, and the method further includes: The network device sends first DCI to the terminal device, where the first DCI indicates the first time-frequency resource.

In a possible design, the first DCI is further used to schedule the first PDSCH.

In a possible design, the first time-frequency resource is the same as a time-frequency resource used to carry the feedback information of the first PDSCH. Alternatively, the first time-frequency resource and the time-frequency resource for carrying the feedback information of the first PDSCH are indicated by a same field in the first DCI.

In a possible design, the method further includes: The network device sends first indication information to the terminal device, where the first indication information indicates a frequency domain resource of the first time-frequency resource; and the network device determines a first time domain resource, the first time domain resource is a time domain resource of the first time-frequency resource, and there is a first correspondence between the first time domain resource and a second time domain resource, where the second time domain resource is a time domain resource occupied by the first PDSCH, a time domain resource occupied by the feedback information of the first PDSCH, or a time domain resource occupied by second DCI, and the second DCI is used to schedule the first PDSCH.

In a possible design, the first correspondence includes at least one of the following correspondences: a correspondence between a start symbol of the first time domain resource and an end symbol of the second time domain resource; a correspondence between a number of a time unit in which the first time domain resource is located and a number of a time unit in which the second time domain resource is located; or a number of a time unit in which the first time domain resource is located being the same as a number of a time unit in which the second time domain resource is located.

In a possible design, the number of the time unit in which the first time domain resource is located is the same as the number of the time unit in which the second time domain resource is located, and a symbol location of the first time domain resource in the time unit is indicated by the network device, for example, indicated by using RRC signaling.

In a possible design, the correspondence between the start symbol of the first time domain resource and the end symbol of the second time domain resource includes: a distance between the start symbol of the first time domain resource and the end symbol of the second time domain resource being a first value. For example, the second time domain resource is a time domain resource occupied by the first PDSCH, and the first value is minimum processing time from a moment at which the terminal device receives a PDSCH to a moment at which the terminal device sends corresponding feedback information, or the first value is a sum of a first offset value and minimum processing time from a moment at which the terminal device receives a PDSCH to a moment at which the terminal device sends corresponding feedback information. The minimum processing time from the moment at which the terminal device receives the PDSCH to the moment at which the terminal device sends the corresponding feedback information may be predefined or configured by using higher layer signaling. The first offset value may be predefined or configured by using higher layer signaling.

In a possible design, a distance between the start symbol of the first time domain resource and the end symbol of the second time domain resource is a first value, and a length of the first time domain resource may be predefined, or indicated by the network device, for example, indicated by higher layer signaling sent by the network device to the terminal device.

In a possible design, the correspondence between the number of the time unit in which the first time domain resource is located and the number of the time unit in which the second time domain resource is located includes: a difference between the number of the time unit in which the first time domain resource is located and the number of the time unit in which the second time domain resource is located being a second value. In this case, a symbol location of the first time domain resource in the time unit may be indicated by the network device, for example, indicated by the network device by using RRC signaling.

In a possible design, the SRS may be a periodic SRS, and the method further includes: The network device sends first configuration information to the terminal device, where the first configuration information is used to determine a transmission periodicity of the periodic SRS and a first time-frequency resource set for carrying the periodic SRS, the first time-frequency resource is the 1$^{st}$ time-frequency resource that is in the first time-frequency resource set and whose start moment is not earlier than a start moment of a symbol S1, and the symbol S1 is the 1$^{st}$ symbol after a first time length starting from an end moment of a second time domain resource, where the second time domain resource is a time domain resource occupied by the first PDSCH, a time domain resource occupied by the feedback information of the first PDSCH, or a time domain resource occupied by second DCI, and the second DCI is used to schedule the first PDSCH. For example, the second time domain resource is a time domain resource occupied by the first PDSCH, and the first time length is minimum processing time from a moment at which the terminal device receives a PDSCH to a moment at which the terminal device sends corresponding feedback information, or the first time length is a sum of a second offset value and minimum processing time from a moment at which the terminal device receives a PDSCH to a moment at which the terminal device sends corresponding feedback information. The minimum processing time from the moment at which the terminal device receives the PDSCH to the moment at which the terminal device sends the corresponding feedback information may be predefined, configured by using higher layer signaling, or specified in a protocol. The second offset value may be predefined, configured by using higher layer signaling, or specified in a protocol.

For technical effects brought by the second aspect or some optional implementations of the second aspect, refer to the descriptions of the technical effects brought by the first aspect or the corresponding implementations.

According to a third aspect, this application provides a communication method. The method may be performed by a terminal device, or may be performed by a chip or a chip system in the terminal device. The following provides descriptions by using an example in which the method is performed by the terminal device. The terminal device receives a first PDSCH from a network device. When failing to decode data carried on the first PDSCH, the terminal device sends channel state information (channel state information, CSI) to the network device on a second time-frequency resource; and/or when successfully decoding data carried on the first PDSCH, the terminal device sends feedback information of the first PDSCH to the network device, where the feedback information includes acknowledgement information.

In a possible design, when failing to decode the data carried on the first PDSCH, the terminal device sends the CSI to the network device on the first time-frequency resource, and the method further includes: The terminal device sends feedback information of the first PDSCH to the network device, where the feedback information includes negative acknowledgement information.

In a possible design, when failing to decode the data carried on the first PDSCH, the terminal device sends the CSI to the network device on the first time-frequency resource, and the method further includes: The terminal device skips sending feedback information of the first PDSCH. Further, when successfully decoding the data carried on the first PDSCH, the terminal device does not send the CSI or the feedback information of the first PDSCH. In this manner, regardless of whether the terminal device successfully decodes or fails to decode the data carried on the first PDSCH, the terminal device may not send the feedback information of the first PDSCH to the network device, to reduce overheads required for transmitting the feedback information of the first PDSCH, and improve resource utilization.

In the foregoing technical solution, when failing to decode the data carried on the first PDSCH, the terminal device may send the CSI to the network device by using the second time-frequency resource, so that the network device can determine, by monitoring whether the terminal device sends the CSI, a result of failing to decode the first PDSCH by the terminal device, and the network device can adjust a retransmission parameter of the first PDSCH based on feedback content of the CSI. In this way, a success probability of retransmitting the first PDSCH is increased and resource utilization efficiency is improved. In the foregoing technical solution, after failing to decode the first PDSCH, the terminal device directly sends the CSI to the network device by using the second time-frequency resource, to reduce an interaction procedure, in the conventional technology, from a moment at which the terminal device fails to decode the first PDSCH to a moment at which the terminal device sends the CSI to the network device. Therefore, in the foregoing technical solution, in addition to improving communication reliability, a communication latency is reduced, thereby reducing air interface resources. Further, when successfully decoding the data carried on the first PDSCH, the terminal device may choose to feed back acknowledgement information to the network device, so that the network device that receives the acknowledgement information can determine that the terminal device successfully decodes the first PDSCH; or the terminal device may choose not to send the feedback information or the CSI to the network device. In this manner, it is implicitly indicated that the first PDSCH is successfully decoded, and does not need to be retransmitted.

In a possible design, when the data carried on the first PDSCH is successfully decoded, the method further includes: The terminal device skips sending the CSI to the network device on the second time-frequency resource. In this manner, when failing to decode the data carried on the first PDSCH, the terminal device sends the CSI on the second time-frequency resource; otherwise, the terminal device does not send the CSI on the second time-frequency resource. In this manner, only a terminal device that fails to receive data actually sends the CSI. In this way, the network device may allocate some time-frequency resources to a plurality of terminal devices to send the CSI, to improve utilization efficiency of a time-frequency resource for carrying the CSI. Further, the network device may use, as a basis for determining whether the terminal device successfully decodes the first PDSCH, whether the CSI is detected on the second time-frequency resource. In this manner, the network device may not need to monitor the feedback information of the first PDSCH, but directly monitor the CSI on the second time-frequency resource, to determine a result of decoding the first PDSCH by the terminal device, so that overheads of air interface resources can be reduced. For example, if the network device detects the CSI on the second time-frequency resource, the network device may determine that the terminal device fails to decode the data carried on the first PDSCH. If the network device does not detect the CSI on the second time-frequency resource, the network device may determine that the terminal device successfully decodes the data carried on the first PDSCH.

In a possible design, the CSI may be obtained by measuring a first (channel state information-reference signal, CSI-RS), and the first CSI-RS is indicated by the network device; or the CSI may be obtained by measuring the first PDSCH. In this manner, before sending the first PDSCH to the terminal device, the network device may further send the first CSI-RS to the terminal device, and the terminal device receives the first CSI-RS. After failing to decode the data carried on the first PDSCH, the terminal device may obtain the CSI based on a result of measuring the first CSI-RS, and send the CSI to the network device. Before sending the first PDSCH to the terminal device, the network device does not send the first CSI-RS to the terminal device. After failing to decode the data carried on the first PDSCH, the terminal device may alternatively obtain the CSI based on a result of measuring data on the first PDSCH or a demodulation reference signal (demodulation reference signal, DMRS), and send the CSI to the network device.

In a possible design, the CSI may be aperiodic CSI, and the method further includes: The terminal device receives third DCI from the network device, where the third DCI indicates the second time-frequency resource. In this manner, after the terminal device fails to decode data carried on a received PDSCH, the network device does not need to temporarily schedule the aperiodic CSI, and the terminal device may send the aperiodic CSI to the network device by using the second time-frequency resource indicated by the third DCI, to reduce an interaction procedure from a moment at which the terminal device fails to decode the data carried on the received PDSCH to a moment at which the terminal device sends the CSI to the network device, and reduce a communication latency.

In a possible design, the third DCI further indicates the first CSI-RS, so that the terminal device obtains the CSI based on a result of measuring the first CSI-RS.

In a possible design, the third DCI is further used to schedule the first PDSCH. In this manner, the network device may simultaneously schedule the aperiodic CSI and the first PDSCH by using one piece of DCI, to reduce overheads of air interface resources.

In a possible design, the second time-frequency resource is the same as a time-frequency resource used to carry the feedback information of the first PDSCH. Alternatively, the second time-frequency resource and the time-frequency resource for carrying the feedback information of the first PDSCH are indicated by a same field in the third DCI. In this manner, the second time-frequency resource may be used to carry the CSI, or may be used to carry the feedback information of the first PDSCH. For example, if the terminal device fails to decode the first PDSCH, the terminal device may send the CSI to the network device by using the second time-frequency resource, and not send the feedback information of the first PDSCH. If the terminal device successfully decodes the first PDSCH, the terminal device may send the feedback information of the first PDSCH to the network device by using the second time-frequency resource, and not send the CSI. For another example, the terminal device always sends the feedback information of the first PDSCH and the CSI to the network device on the second time-frequency resource. That is, the network device does not need to separately configure time-frequency resources carrying the CSI and the feedback information of the first PDSCH, to improve utilization of time-frequency resources.

In a possible design, the method further includes: The terminal device receives second indication information from the network device, where the second indication information indicates a frequency domain resource of the second time-frequency resource; and the terminal device determines a third time domain resource, the third time domain resource is a time domain resource of the second time-frequency resource, and there is a second correspondence between the third time domain resource and a second time domain resource, where the second time domain resource is a time domain resource occupied by the first PDSCH, a time domain resource occupied by the feedback information of the first PDSCH, or a time domain resource occupied by second DCI, and the second DCI is used to schedule the first PDSCH. In this manner, when the terminal device fails to decode the data carried on the first PDSCH, the terminal device may determine the time domain resource of the second time-frequency resource based on the time domain resource occupied by the first PDSCH, the time domain resource occupied by the feedback information of the first PDSCH, or the time domain resource occupied by the second DCI, and then determine the second time-frequency resource with reference to the frequency domain resource that is of the second time-frequency resource and that is indicated by the network device, to send the CSI to the network device by using the second time-frequency resource. The time domain resource of the second time-frequency resource is related to the time domain resource occupied by the first PDSCH, the time domain resource occupied by the feedback information of the first PDSCH, or the time domain resource occupied by the second DCI, and the terminal device may determine the time domain resource of the second time-frequency resource based on the time domain resource occupied by the first PDSCH, the time domain resource occupied by the feedback information of the first PDSCH, or the time domain resource occupied by the second DCI. Therefore, the network device does not need to indicate the time domain resource of the second time-frequency resource to the terminal device, so that overheads of the indication information are reduced, and air interface resources can be reduced.

In a possible design, the second correspondence includes at least one of the following correspondences: a correspondence between a start symbol of the third time domain resource and an end symbol of the second time domain resource; a correspondence between a number of a time unit in which the third time domain resource is located and a number of a time unit in which the second time domain resource is located; or a number of a time unit in which the third time domain resource is located being the same as a number of a time unit in which the second time domain resource is located. In this manner, because a symbol location of the second time domain resource or a location of the time unit in which the second time domain resource is located implicitly indicates the third time domain resource, the terminal device may determine the third time domain resource based on the symbol location of the second time domain resource or the location of the time unit in which the second time domain resource is located.

In a possible design, the number of the time unit in which the third time domain resource is located is the same as the number of the time unit in which the second time domain resource is located. A symbol location of the third time domain resource in the time unit may be indicated by the network device, for example, indicated by using RRC signaling.

In a possible design, the correspondence between the start symbol of the third time domain resource and the end symbol of the second time domain resource includes: a distance between the start symbol of the third time domain resource and the end symbol of the second time domain resource being a third value. For example, the second time domain resource is a time domain resource occupied by the first PDSCH, and the third value may be determined by at least one of minimum processing time from a moment at which the terminal device receives a PDSCH to a moment at which the terminal device sends corresponding feedback information, minimum processing time from a moment at which the terminal device receives a CSI-RS to a moment at which the terminal device sends CSI, or a third offset value. For example, the third value is the minimum processing time from the moment at which the terminal device receives the PDSCH to the moment at which the terminal device sends the corresponding feedback information. For example, the third value is a sum of the third offset value and the minimum processing time from the moment at which the terminal device receives the CSI-RS to the moment at which the terminal device sends the CSI. For another example, the third value is a sum of the third offset value and the minimum processing time from the moment at which the terminal device receives the PDSCH to the moment at which the terminal device sends the corresponding feedback information. The minimum processing time from the moment at which the terminal device receives the PDSCH to the moment at which the terminal device sends the corresponding feedback information may be predefined, configured by using higher layer signaling, or specified in a protocol. The minimum processing time from the moment at which the terminal device receives the CSI-RS to the moment at which the terminal device sends the CSI may be predefined, configured by using higher layer signaling, or specified in a protocol. The third offset value may be predefined, configured by using higher layer signaling, or specified in a protocol.

In a possible design, a distance between the start symbol of the third time domain resource and the end symbol of the second time domain resource is a third value, and a length of the third time domain resource may be indicated by the network device, for example, indicated by a higher layer RRC parameter.

In a possible design, the correspondence between the number of the time unit in which the third time domain resource is located and the number of the time unit in which the second time domain resource is located includes: a difference between the number of the time unit in which the third time domain resource is located and the number of the time unit in which the second time domain resource is located being a fourth value. A symbol location of the third time domain resource in the time unit may be indicated by the network device, for example, indicated by using RRC signaling.

In a possible design, the CSI may be periodic CSI, and the method further includes: The terminal device receives second configuration information from the network device, where the second configuration information is used to determine a transmission periodicity of the periodic CSI and a second time-frequency resource set for carrying the periodic CSI, the second time-frequency resource is the 1$^{st}$ time-frequency resource that is in the second time-frequency resource set and whose start moment is not earlier than a start moment of a symbol S2, and the symbol S2 is the 1st symbol after a second time length starting from an end moment of a second time domain resource, where the second time domain resource is a time domain resource occupied by the first PDSCH, a time domain resource occupied by the feedback information of the first PDSCH, or a time domain resource occupied by second DCI, and the second DCI is used to schedule the first PDSCH. For example, the second time domain resource is a time domain resource occupied by the first PDSCH, and the second time length may be determined by at least one of minimum processing time from a moment at which the terminal device receives a PDSCH to a moment at which the terminal device sends corresponding feedback information, minimum processing time from a moment at which the terminal device receives a CSI-RS to a moment at which the terminal device sends CSI, or a fourth offset value. For example, the second time length is the minimum processing time from the moment at which the terminal device receives the PDSCH to the moment at which the terminal device sends the corresponding feedback information. For example, the second time length is a sum of the fourth offset value and the minimum processing time from the moment at which the terminal device receives the PDSCH to the moment at which the terminal device sends the corresponding feedback information. For another example, the second time length is a sum of the fourth offset value and the minimum processing time from the moment at which the terminal device receives the CSI-RS to the moment at which the terminal device sends the CSI. The minimum processing time from the moment at which the terminal device receives the PDSCH to the moment at which the terminal device sends the corresponding feedback information may be predefined or configured by using higher layer signaling. The minimum processing time from the moment at which the terminal device receives the CSI-RS to the moment at which the terminal device sends the CSI may be predefined or configured by using higher layer signaling. The fourth offset value may be predefined or configured by using higher layer signaling. In this manner, the terminal device may first determine the transmission periodicity of the periodic CSI and the second time-frequency resource set based on the received second configuration information, where a time-frequency resource included in the second time-frequency resource set is used to carry the periodic CSI. After the terminal device fails to decode the data carried on the received PDSCH, the terminal device may select a second time-frequency resource from the second time-frequency resource set to carry the periodic CSI, to reduce an interaction procedure from a moment at which the terminal device fails to decode the data carried on the received PDSCH to a moment at which the terminal device sends the CSI to the network device, reduce air interface resources, and reduce a communication latency.

According to a fourth aspect, this application provides a communication method. The method may be performed by a network device, or may be performed by a chip or a chip system in the network device. The following provides descriptions by using an example in which the method is performed by the network device. The network device sends a first PDSCH to a terminal device, and receives CSI from the terminal device on a second time-frequency resource.

In a possible design, that the network device receives CSI from the terminal device on a second time-frequency resource includes: When the network device receives feedback information of the first PDSCH from the terminal device, and the feedback information is a NACK, the network device receives the CSI from the terminal device on the second time-frequency resource; and/or when the network device does not receive feedback information of the first PDSCH from the terminal device, the network device receives the CSI from the terminal device on the second time-frequency resource.

In a possible design, that the network device receives CSI from the terminal device on a second time-frequency resource further includes: When the CSI from the terminal device is not detected on the second time-frequency resource, the network device may directly determine that the first PDSCH is correctly decoded. When the CSI from the terminal device is detected on the second time-frequency resource, the network device may alternatively determine that the first PDSCH is not correctly decoded. In other words, the network device determines, based on whether the CSI is detected on the second time-frequency resource, whether the terminal device correctly decodes the first PDSCH. In this way, time-frequency resources required for sending the feedback information of the first PDSCH by the terminal device to the network device can be reduced, thereby reducing overheads of air interface resources. Optionally, the network device may determine, through sequence or energy detection, whether the CSI from the terminal device is detected on the second time-frequency resource. Alternatively, the network device may receive the CSI on the second time-frequency resource, and perform decoding and CRC check on the CSI to determine whether the CSI from the terminal device is detected. If the cyclic redundancy check (cyclic redundancy check, CRC) check succeeds, the network device determines that the CSI from the terminal device is detected. If the CRC check fails, the network device determines that the CSI from the terminal device is not detected.

In a possible design, the CSI may be obtained by the terminal device based on a result of measuring a first CI-RS, and the first CSI-RS is indicated by the network device to the terminal device; or the CSI may be obtained by the terminal device based on a result of measuring the first PDSCH.

In a possible design, the CSI may be aperiodic CSI, and the method further includes: The network device sends third downlink control information DCI to the terminal device, where the third DCI indicates the second time-frequency resource.

In a possible design, the third DCI is further used to schedule the first PDSCH.

In a possible design, the second time-frequency resource is the same as a time-frequency resource used to carry the feedback information of the first PDSCH. Alternatively, the second time-frequency resource and the time-frequency resource for carrying the feedback information of the first PDSCH are indicated by a same field in the third DCI.

In a possible design, the method further includes: The network device sends second indication information to the terminal device, where the second indication information indicates a frequency domain resource of the second time-frequency resource; and the network device may determine a third time domain resource, the third time domain resource is a time domain resource of the second time-frequency resource, and there is a second correspondence between the third time domain resource and a second time domain resource, where the second time domain resource is a time domain resource occupied by the first PDSCH, a time domain resource occupied by the feedback information of the first PDSCH, or a time domain resource occupied by second DCI, and the second DCI is used to schedule the first PDSCH.

In a possible design, the second correspondence includes at least one of the following correspondences: a correspondence between a start symbol of the third time domain resource and an end symbol of the second time domain resource; a correspondence between a number of a time unit in which the third time domain resource is located and a number of a time unit in which the second time domain resource is located; or a number of a time unit in which the third time domain resource is located being the same as a number of a time unit in which the second time domain resource is located.

In a possible design, the number of the time unit in which the third time domain resource is located is the same as the number of the time unit in which the second time domain resource is located, and a symbol location of the third time domain resource in the time unit is indicated by the network device, for example, indicated by using RRC signaling.

In a possible design, the correspondence between the start symbol of the third time domain resource and the end symbol of the second time domain resource includes: a distance between the start symbol of the third time domain resource and the end symbol of the second time domain resource being a third value. For example, the second time domain resource is a time domain resource occupied by the first PDSCH, and the third value may be determined by at least one of minimum processing time from a moment at which the terminal device receives a PDSCH to a moment at which the terminal device sends corresponding feedback information, minimum processing time from a moment at which the terminal device receives a CSI-RS to a moment at which the terminal device sends CSI, or a third offset value. For example, the third value is the minimum processing time from the moment at which the terminal device receives the PDSCH to the moment at which the terminal device sends the corresponding feedback information. For example, the third value is a sum of the third offset value and the minimum processing time from the moment at which the terminal device receives the CSI-RS to the moment at which the terminal device sends the CSI. For another example, the third value is a sum of the third offset value and the minimum processing time from the moment at which the terminal device receives the PDSCH to the moment at which the terminal device sends the corresponding feedback information. The minimum processing time from the moment at which the terminal device receives the PDSCH to the moment at which the terminal device sends the corresponding feedback information may be predefined, configured by using higher layer signaling, or specified in a protocol. The minimum processing time from the moment at which the terminal device receives the CSI-RS to the moment at which the terminal device sends the CSI may be predefined, configured by using higher layer signaling, or specified in a protocol. The third offset value may be predefined, configured by using higher layer signaling, or specified in a protocol.

In a possible design, a distance between the start symbol of the third time domain resource and the end symbol of the second time domain resource is a third value, and a length of the third time domain resource may be indicated by the network device, for example, indicated by a higher layer RRC parameter.

In a possible design, the correspondence between the number of the time unit in which the third time domain resource is located and the number of the time unit in which the second time domain resource is located includes: a difference between the number of the time unit in which the third time domain resource is located and the number of the time unit in which the second time domain resource is located being a fourth value. In this case, a symbol location of the third time domain resource in the time unit is indicated by the network device, for example, indicated by using RRC signaling.

In a possible design, the CSI may be periodic CSI, and the method further includes: The network device sends first configuration information to the terminal device, where the first configuration information is used to determine a transmission periodicity of the periodic CSI and a second time-frequency resource set for carrying the periodic CSI, the second time-frequency resource is the 1st time-frequency resource that is in the second time-frequency resource set and whose start moment is not earlier than a start moment of a symbol S2, and the symbol S2 is the 1st symbol after a second time length starting from an end moment of a second time domain resource, where the second time domain resource is a time domain resource occupied by the first PDSCH, a time domain resource occupied by the feedback information of the first PDSCH, or a time domain resource occupied by second DCI, and the second DCI is used to schedule the first PDSCH. For example, the second time domain resource is a time domain resource occupied by the first PDSCH, and the second time length may be determined by at least one of minimum processing time from a moment at which the terminal device receives a PDSCH to a moment at which the terminal device sends corresponding feedback information, minimum processing time from a moment at which the terminal device receives a CSI-RS to a moment at which the terminal device sends CSI, or a fourth offset value. For example, the second time length is the minimum processing time from the moment at which the terminal device receives the PDSCH to the moment at which the terminal device sends the corresponding feedback information. For example, the second time length is a sum of the fourth offset value and the minimum processing time from the moment at which the terminal device receives the PDSCH to the moment at which the terminal device sends the corresponding feedback information. For another example, the second time length is a sum of the fourth offset value and the minimum processing time from the moment at which the terminal device receives the CSI-RS to the moment at which the terminal device sends the CSI. The minimum processing time from the moment at which the terminal device receives the PDSCH to the moment at which the terminal device sends the corresponding feedback information may be predefined, configured by using higher layer signaling, or specified in a protocol. The minimum processing time from the moment at which the terminal device receives the CSI-RS to the moment at which the terminal device sends the CSI may be predefined, configured by using higher layer signaling, or specified in a protocol. The fourth offset value may be predefined, configured by using higher layer signaling, or specified in a protocol.

For technical effects brought by the fourth aspect or some possible designs of the fourth aspect, refer to the descriptions of the technical effects brought by the third aspect or the corresponding possible designs.

According to a fifth aspect, this application provides a communication method. The method may be performed by a terminal device, or may be performed by a chip or a chip system in the terminal device. The following provides descriptions by using an example in which the method is performed by the terminal device. The terminal device receives a first PDSCH or a second CSI-RS from a network device on a third time-frequency resource, obtains a fifth value through calculation based on the first PDSCH or the second CSI-RS. When the fifth value is less than a first threshold, the terminal device sends first information to the network device on a fourth time-frequency resource; and/or when the fifth value is greater than or equal to a first threshold, the terminal device does not send first information to the network device on a fourth time-frequency resource, where the first information includes an SRS or CSI, and the first threshold may be predefined or indicated by the network device.

In a possible design, that the terminal device obtains a fifth value through calculation based on the first PDSCH or the second CSI-RS includes: The terminal device may obtain the fifth value through calculation based on a result of measuring data on the first PDSCH and/or a result of measuring a DMRS piggybacked on the first PDSCH. Alternatively, the terminal device may obtain the fifth value through calculation based on a result of measuring the second CSI-RS.

In a possible design, the fifth value indicates a receiving capability of the terminal device to receive information on a fifth time-frequency resource, and the fifth time-frequency resource may be a part or all of the third time-frequency resource.

For example, the fifth value may be a signal to interference plus noise ratio (signal to interference plus noise ratio, SINR) for receiving information by the terminal device on the fifth time-frequency resource. For another example, the fifth value may be a probability that the terminal device successfully receives information on the fifth time-frequency resource. For another example, the fifth value may be a corresponding first channel quality indicator (channel quality indicator, CQI) index (index) when information is transmitted on the fifth time-frequency resource, and the first CQI index may be a largest CQI index that meets a first condition, the first condition may be that a bit error rate of receiving data by the terminal device on a sixth time-frequency resource does not exceed a sixth value. The sixth time-frequency resource may be predefined or indicated by the network device. For example, the sixth time-frequency resource may be the fifth time-frequency resource, and the sixth value may be predefined or indicated by the network device.

For example, before the terminal device obtains the fifth value through calculation, the method may further include: The terminal device determines a rank indicator (rank indicator, RI) and/or a precoding matrix indication (precoding matrix indication, PMI). The RI may be predefined or indicated by the network device, and the PMI may be predefined or indicated by the network device. Optionally, when the terminal device receives the first PDSCH, the RI is a quantity of ports of the PDSCH and/or the DMRS, and the PMI is an identity matrix.

In the foregoing technical solution, the terminal device receives the first PDSCH or the second CSI-RS, and determines, based on receiving quality of the first PDSCH or the second CSI-RS, whether to send the SRS or the CSI. When the receiving quality of the first PDSCH or the second CSI-RS is poor, the terminal device sends the SRS or the CSI to the network device, so that the network device obtains and updates channel information or interference information of the terminal device. In this way, the network device may adjust, in time, a transmission parameter for subsequent data transmission with the terminal device, for example, adjust a modulation and coding scheme (modulation and coding scheme, MCS). This avoids a problem that subsequent transmission fails because the channel information or the interference information is not updated in time. In addition, because the terminal device sends the SRS or the CSI to the network device only when channel receiving quality is poor, a probability that a single terminal device sends the SRS or the CSI is reduced, and a plurality of terminal devices may reuse a same time-frequency location to send respective SRSs or CSI to the network device, to reduce overheads of air interface resources for sending the SRSs or the CSI.

In a possible design, the method further includes: The terminal device sends a first sequence to the network device on a seventh time-frequency resource. The seventh time-frequency resource may be a part or all of the fourth time-frequency resource, a time-frequency location of the seventh time-frequency resource may be determined by an identity (identity, ID) of the terminal device, and/or the first sequence may be determined by the ID of the terminal device. In this manner, if a plurality of terminal devices reuse a same time-frequency location to send respective SRSs or CSI to the network device, the network device may determine, by performing terminal device blind detection at the time-frequency location, an ID of a terminal device that sends the first sequence, to complete SRS or CSI receiving on the fourth time-frequency resource. For example, the network device may determine, by monitoring the first sequence (for example, an initialization ID or an initial cyclic shift of the first sequence), the ID of the terminal device that sends the first sequence. For another example, the network device may determine, by monitoring a time-frequency resource location of the first sequence, the ID of the terminal device that sends the first sequence. Optionally, the first sequence may be an SRS sequence or a DMRS sequence of the CSI.

In a possible design, the method further includes: The terminal device receives third indication information from the network device, where the third indication information indicates the fourth time-frequency resource. The third indication information includes at least one of RRC signaling, a media access control-control element (media access control-control element, MAC-CE), or DCI.

For example, when the SRS is a periodic SRS or the CSI is periodic CSI, the third indication information may be RRC signaling. For another example, when the SRS is an aperiodic SRS or the CSI is aperiodic CSI, the third indication information may be DCI.

In a possible design, the method further includes: The terminal device receives fourth indication information from the network device, where the fourth indication information indicates a frequency domain resource of the fourth time-frequency resource; and the terminal device determines a time domain resource of the fourth time-frequency resource based on a third correspondence between a time domain resource of the third time-frequency resource and a time domain resource of the fourth time-frequency resource. Optionally, the terminal device receives the third correspondence from the network device, where the third correspondence may be a correspondence between the time domain resource of the third time-frequency resource and the time domain resource of the fourth time-frequency resource.

According to a sixth aspect, this application provides a communication method. The method may be performed by a network device, or may be performed by a chip or a chip system in the network device. The following provides descriptions by using an example in which the method is performed by the network device. The network device sends a first PDSCH or a second CSI-RS to a terminal device on a third time-frequency resource; receives a first sequence from the terminal device on a seventh time-frequency resource, and determines an ID of the terminal device based on the first sequence; and receives first information from the terminal device on a fourth time-frequency resource based on the ID of the terminal device, where the first information includes an SRS or CSI, the first threshold may be predefined or indicated by the network device, and the seventh time-frequency resource may be a part or all of the fourth time-frequency resource.

In a possible design, that the network device determines an ID of the terminal device based on the first sequence includes: The network device may determine the ID of the terminal device by monitoring the first sequence (for example, an initialization ID or an initial cyclic shift of the first sequence) and/or by monitoring a time-frequency resource location of the first sequence. Optionally, the first sequence may be an SRS sequence or a DMRS sequence of the CSI.

In a possible design, the method further includes: The network device sends third indication information to the terminal device, where the third indication information indicates the fourth time-frequency resource, and the third indication information includes at least one of RRC signaling, a MAC-CE, or DCI.

For example, when the SRS is a periodic SRS or the CSI is periodic CSI, the third indication information may be RRC signaling. For another example, when the SRS is an aperiodic SRS or the CSI is aperiodic CSI, the third indication information may be DCI.

In a possible design, the method further includes: The network device sends fourth indication information to the terminal device, where the fourth indication information indicates a frequency domain resource of the fourth time-frequency resource. Optionally, the method further includes: The network device indicates a third correspondence to the terminal device, where the third correspondence may be a correspondence between a time domain resource of the third time-frequency resource and a time domain resource of the fourth time-frequency resource.

For technical effects brought by the sixth aspect or some possible designs of the sixth aspect, refer to the descriptions of the technical effects brought by the fifth aspect or the corresponding possible designs.

According to a seventh aspect, this application provides a communication apparatus. For beneficial effects, refer to the descriptions in the first aspect, the third aspect, or the fifth aspect. Details are not described herein again. The communication apparatus has a function of implementing the terminal device in the method example in the first aspect, the third aspect, or the fifth aspect. The function may be implemented by hardware, or may be implemented by hardware by executing corresponding software. The hardware or the software includes one or more modules corresponding to the foregoing function.

In a possible design, the communication apparatus includes a transceiver module and a processing module. The transceiver module is configured to receive a first PDSCH from a network device, and the processing module is configured to determine whether data carried on the first PDSCH is successfully decoded or fails to be decoded. When the processing module determines that the data carried on the first PDSCH fails to be decoded, the transceiver module sends an SRS to the network device on a first time-frequency resource; and/or when the processing module determines that the data carried on the first PDSCH is successfully decoded, the transceiver module sends feedback information of the first PDSCH to the network device. These modules may perform corresponding functions in the method example in the first aspect. For details, refer to the detailed descriptions in the method example. Details are not described herein again.

In another possible design, the communication apparatus includes a transceiver module and a processing module. The transceiver module is configured to receive a first PDSCH from a network device, and the processing module is configured to determine whether data carried on the first PDSCH fails to be decoded or is successfully decoded. When the processing unit determines that the data carried on the first PDSCH fails to be decoded, the transceiver module sends CSI to the network device on a second time-frequency resource; and/or when the processing module determines that the data carried on the first PDSCH is successfully decoded, the transceiver module sends feedback information of the first PDSCH to the network device. These modules may perform corresponding functions in the method example in the third aspect. For details, refer to the detailed descriptions in the method example. Details are not described herein again.

In another possible design, the communication apparatus includes a transceiver module and a processing module. The transceiver module is configured to receive a first PDSCH or a second CSI-RS on a third time-frequency resource. The processing module is configured to obtain a fifth value through calculation based on the first PDSCH or the second CSI-RS. The processing module is further configured to: when the fifth value is less than a first threshold, control the transceiver module to send first information to a network device on a fourth time-frequency resource; and/or when the fifth value is greater than or equal to a first threshold, control the transceiver module not to send first information to a network device on a fourth time-frequency resource. These modules may perform corresponding functions in the method example in the fifth aspect. For details, refer to the detailed descriptions in the method example. Details are not described herein again.

According to an eighth aspect, this application provides a communication apparatus. For beneficial effects, refer to the descriptions in the second aspect, the fourth aspect, or the sixth aspect. Details are not described herein again. The communication apparatus has a function of implementing the network device in the method example in the second aspect, the fourth aspect, or the sixth aspect. The function may be implemented by hardware, or may be implemented by hardware by executing corresponding software. The hardware or the software includes one or more modules corresponding to the foregoing function.

In a possible design, the communication apparatus includes a processing module and a transceiver module. The transceiver module is configured to send a first PDSCH to a terminal device. The processing module is configured to: when feedback information of the first PDSCH is received from the terminal device, and the feedback information is a NACK, control the transceiver module to receive an SRS from the terminal device on a first time-frequency resource; and/or when feedback information of the first PDSCH from the terminal device is not received, control the transceiver module to receive an SRS from the terminal device on a first time-frequency resource. These modules may perform corresponding functions in the method example in the second aspect. For details, refer to the detailed descriptions in the method example. Details are not described herein again.

In a possible design, the communication apparatus includes a processing module and a transceiver module. The transceiver module is configured to send a first PDSCH to a terminal device. The processing module is configured to: when feedback information of the first PDSCH is received from the terminal device, and the feedback information is a NACK, control the transceiver module to receive CSI from the terminal device on a second time-frequency resource; and/or when feedback information of the first PDSCH from the terminal device is not received, control the transceiver module to receive CSI from the terminal device on a second time-frequency resource. These modules may perform corresponding functions in the method example in the fourth aspect. For details, refer to the detailed descriptions in the method example. Details are not described herein again.

In another possible design, the communication apparatus includes a processing module and a transceiver module. The transceiver module is configured to: send a first PDSCH or a second CSI-RS to a terminal device on a third time-frequency resource, and receive a first sequence from the terminal device on a sixth time-frequency resource. The processing module is configured to determine an ID of the terminal device based on the first sequence, and the processing module is further configured to control, based on the ID of the terminal device, the transceiver module to receive first information from the terminal device on a fourth time-frequency resource. These modules may perform corresponding functions in the method example in the sixth aspect. For details, refer to the detailed descriptions in the method example. Details are not described herein again.

According to a ninth aspect, this application provides a communication apparatus. The communication apparatus may be the terminal device in the method embodiment in the first aspect, the third aspect, or the fifth aspect, or may be a chip disposed in the terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the terminal device in the foregoing method embodiment.

According to a tenth aspect, this application provides a communication apparatus. The communication apparatus may be the network device in the method embodiment in the second aspect, the fourth aspect, or the sixth aspect, or may be a chip disposed in the network device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the network device in the foregoing method embodiment.

According to an eleventh aspect, this application provides a computer program product. The computer program product includes computer program code. When the computer program code is run, the method performed by the terminal device in the first aspect, the third aspect, or the fifth aspect is performed.

According to a twelfth aspect, this application provides a computer program product. The computer program product includes computer program code. When the computer program code is run, the method performed by the network device in the second aspect, the fourth aspect, or the sixth aspect is performed.

According to a thirteenth aspect, this application provides a chip system. The chip system includes a processor, configured to implement a function of the terminal device in the method according to the first aspect, the third aspect, or the fifth aspect. In a possible design, the chip system further includes a memory, configured to store program instructions and/or data. The chip system may include a chip, or may include a chip and another discrete component.

According to a fourteenth aspect, this application provides a chip system. The chip system includes a processor, configured to implement a function of the network device in the method according to the second aspect, the fourth aspect, or the sixth aspect. In a possible design, the chip system further includes a memory, configured to store program instructions and/or data. The chip system may include a chip, or may include a chip and another discrete component.

According to a fifteenth aspect, this application provides a computer-readable storage medium. The computer-readable storage medium stores a computer program. When the computer program is run, the method performed by the terminal device in the first aspect, the third aspect, or the fifth aspect is implemented.

According to a sixteenth aspect, this application provides a computer-readable storage medium. The computer-readable storage medium stores a computer program. When the computer program is run, the method performed by the network device in the second aspect, the fourth aspect, or the sixth aspect is implemented.

DESCRIPTION OF EMBODIMENTS

The following further describes in detail embodiments of this application with reference to the accompanying drawings.

Technical solutions in embodiments of this application may be applied to various communication systems, for example, a long term evolution (long term evolution, LTE) system, a 5G mobile communication system, and a future mobile communication system.

All aspects, embodiments, or features are presented in embodiments of this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of the solutions may further be used.

In addition, the term "for example" in embodiments of this application is used to represent giving an example, an illustration, or a description. Any embodiment or design scheme described as an "example" in embodiments of this application should not be explained as being more preferred or having more advantages than another embodiment or design scheme. Exactly, the term "example" is used to present a concept in a specific manner.

In embodiments of this application, the term "information (information)", "signal (signal)", "message (message)", or "channel (channel)" may sometimes be interchangeably used. It should be noted that when differences are not emphasized, meanings to be expressed are the same. The terms "of (of)", "corresponding (corresponding, relevant)", and "corresponding to (corresponding)" may be interchangeably used sometimes. It should be noted that when differences are not emphasized, meanings to be expressed are the same.

A network architecture and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

Embodiments of this application may be applied to a time division duplex (time division duplex, TDD) scenario, and may also be applied to a frequency division duplex (frequency division duplex, FDD) scenario.

In embodiments of this application, an NR network scenario in a wireless communication network is used to describe some scenarios. It should be noted that the solutions in embodiments of this application may be further applied to another wireless communication network, and a corresponding name may also be replaced with a name of a corresponding function in the another wireless communication network.

Figure 1:
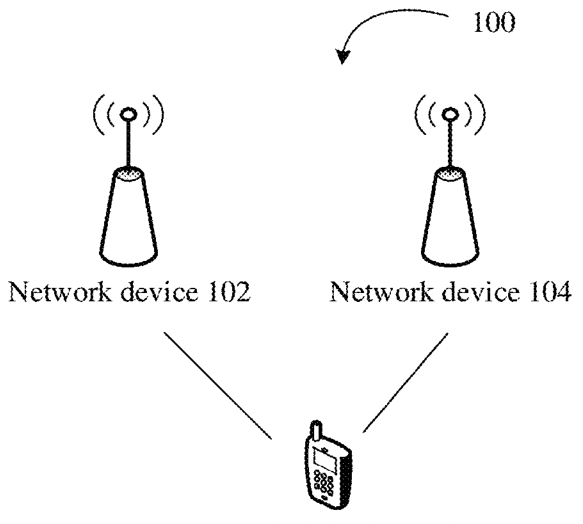
FIG. 1 is a schematic diagram of a communication system to which an embodiment of this application is applicable.

For ease of understanding embodiments of this application, a communication system shown in FIG. 1 is first used as an example to describe in detail a communication system applicable to embodiments of this application. FIG. 1 is a schematic diagram of a communication system applicable to a communication method according to an embodiment of this application. As shown in FIG. 1, the communication system 100 includes a network device 102 and a terminal device 106. A plurality of antennas may be configured for the network device 102, and a plurality of antennas may also be configured for the terminal device. Optionally, the communication system may further include a network device 104, and a plurality of antennas may also be configured for the network device 104. Both the network device 102 and the network device 104 may communicate with the terminal device 106. The network device 102 and the network device 104 may further communicate with any quantity of terminal devices similar to the terminal device 106. However, it should be understood that a terminal device communicating with the network device 102 and a terminal device communicating with the network device 104 may be the same or may be different. The terminal device 106 shown in FIG. 1 may simultaneously communicate with the network device 102 and the network device 104. However, this shows only one possible scenario. In some scenarios, the terminal device 106 may communicate only with the network device 102 or communicate only with the network device 104. This is not limited in embodiments of this application.

The network device 102 may be an access network device, and the access network device may also be referred to as a radio access network (radio access network, RAN) device, and is a device that provides a wireless communication function for the terminal device 106. The access network device includes, for example, but is not limited to, a next generation NodeB (generation NodeB, gNB), an evolved NodeB (evolved NodeB, eNB), a baseband unit (baseband unit, BBU), a transmission reception point (transmission reception point, TRP), or a transmission point (transmission point, TP) in 5G, a base station in a future mobile communication system, or an access point in a Wi-Fi system. Alternatively, the access network device may be a radio controller, a centralized unit (centralized unit, CU), and/or a distributed unit (distributed unit, DU) in a cloud radio access network (cloud radio access network, CRAN) scenario, or the network device 102 may be a relay station, a vehicle-mounted device, a network device in a future evolved network, or the like.

The terminal device 106 may communicate with a plurality of access network devices that use different technologies. For example, the terminal device 106 may communicate with an access network device that supports LTE, or may communicate with an access network device that supports 5G, or may simultaneously communicate with the access network device that supports LTE and the access network device that supports 5G. This is not limited in embodiments of this application.

In embodiments of this application, an apparatus configured to implement a function of the network device may be a network device, or may be an apparatus, for example, a chip system, that can support the network device in implementing the function. The apparatus may be installed in the network device. In embodiments of this application, the technical solutions provided in embodiments of this application are described by using an example in which the apparatus configured to implement the function of the network device is the network device.

The terminal device 106 may be referred to as a terminal for short, or referred to as user equipment (user equipment, UE), and is a device having a wireless transceiver function. The terminal device 106 may be deployed on land, including an indoor device, an outdoor device, a handheld device, or a vehicle-mounted device, or may be deployed on a water surface (such as a ship), or may be deployed in the air (for example, on aircraft, an uncrewed aerial vehicle, a balloon, or a satellite). The terminal device may be a mobile phone, a tablet computer, a computer having a wireless transceiver function, a virtual-reality terminal device, an augmented-reality terminal device, a wireless terminal device in industrial control, a wireless terminal device in self-driving, a wireless terminal device in telemedicine, a wireless terminal device in a smart grid, a wireless terminal device in transportation safety, a wireless terminal device in a smart city, or a wireless terminal device in a smart home. The terminal device 106 may also be fixed or mobile. This is not limited in embodiments of this application.

In embodiments of this application, an apparatus configured to implement a function of the terminal may be a terminal device, or may be an apparatus, for example, a chip system, that can support the terminal device in implementing the function. The apparatus may be installed in the terminal device. In embodiments of this application, the chip system may include a chip, or may include a chip and another discrete component. In embodiments of this application, the technical solutions provided in embodiments of this application are described by using an example in which the apparatus configured to implement the function of the terminal device is the terminal device.

It should be understood that FIG. 1 is only a simplified schematic diagram of an example for ease of understanding. The communication system may further include another network device or another terminal device. This is not limited in embodiments of this application.

The following describes some related technical features in embodiments of this application.

A 5G communication system is dedicated to supporting higher system performance, for example, supporting a plurality of service types, different deployment scenarios, and a wider spectral range. The plurality of service types may include an enhanced mobile broadband (Enhanced Mobile Broadband, eMBB) service, a massive machine type communication (Massive Machine type Communication, mMTC) service, a URLLC service, a multimedia broadcast multicast service (Multimedia Broadcast Multicast Service, MBMS), a positioning service, or the like. The deployment scenario may include an indoor hotspot (indoor hotspot) scenario, a dense urban (dense urban) scenario, a suburban scenario, an urban macro (urban macro) scenario, a high-speed railway scenario, or the like. The wider spectral range is a spectral range up to 100 GHz that is supported by 5G, includes a low-frequency part less than 6 GHz, and also includes a high-frequency part ranging from 6 GHz to 100 GHz.

There are many URLLC service types, for example, industrial control, industrial production process automation, human computer interaction, or telemedicine. To provide a reference input and an evaluation criterion for the design of the 5G communication system, the $3^{rd}$ generation partnership project ($3^{rd}$ generation partnership project, 3GPP) working group uses a latency, reliability, and a system capacity as performance indicators for quantifying URLLC services.

1. A latency is transmission time that is required for an application-layer data packet of a user to reach a service data unit (service data unit, SDU) of a radio protocol stack layer 2/3 of a receiving end from an SDU of a radio protocol stack layer 2/3 of a transmitting end. If neither a base station nor a terminal device is in a discontinuous reception (discontinuous reception, DRX) state, a user plane latency requirement of a URLLC service between the base station and the terminal device is that both an average uplink transmission latency and an average downlink transmission latency are 0.5 ms.

2. Reliability is a success probability that the transmitting end correctly transmits a plurality of bits to the receiving end within specific time (for example, L seconds). Different URLLC services may have different reliability requirements. For example, for a common URLLC service, a reliability requirement of the service may be that a transmission success rate of sending 32-byte (byte) data reaches 99.999% within 1 ms. For another example, for some extremely stringent industrial control services, a reliability requirement of the service may be that a transmission success rate reaches 99.9999999% within 0.25 ms.

3. A system capacity is a maximum cell throughput that a system can reach on the premise that a quantity of interrupted users meets a specific proportion. The interrupted user is a user whose reliability requirement cannot be met within a specific latency range.

In the future, smart manufacturing in factories will be an important URLLC application. The most challenging service in smart factories is a motion control (motion control)-type service. In one aspect, the motion control-type service has an extremely low requirement on latency (for example, 1 ms loopback latency, that is, 0.5 ms unidirectional air interface latency) and an extremely high requirement on reliability (for example, 99.9999% to 99.9999999% reliability). In another aspect, the motion control-type service has features of a small packet (where for example, a data packet size is 30 bytes) and massive connections, and a TRP needs to serve a large quantity of devices (for example, dozens or even hundreds of devices). For a URLLC service with a small packet and massive connections, using a dynamic scheduling transmission policy has the following problems: A small data packet causes an excessively large proportion of overheads of control signaling, for example, DCI, transmitted during dynamic scheduling, and a great reduction of effective resources for carrying data. A large quantity of terminal devices causes excessively large overheads of a reference signal for channel measurement. To overcome the defects existing in the dynamic scheduling transmission policy, a semi-persistent scheduling (semi-persistent scheduling, SPS) transmission policy may be considered for use. In one aspect, control signaling may be reduced, and signaling overheads may be greatly reduced. In another aspect, a single terminal device may be restricted to perform transmission only on an allocated narrowband. In this way, each terminal device needs to receive and send a reference signal only on a corresponding narrowband. This reduces reference signal overheads. However, a communication link is affected by factors such as deep fading (deep fading), burst interference, a radio frequency error, or electromagnetic electric welding, and cannot always maintain stability. Therefore, only SPS transmission cannot ensure an extremely high reliability requirement of the motion control-type service. Therefore, the SPS transmission policy needs to be combined with a HARQ technology.

A PDSCH carrying data is used as an example. A network device sends the PDSCH to the terminal device, and the terminal device receives the PDSCH. For example, the PDSCH carries a URLLC service. After the HARQ technology is combined, if the terminal device successfully decodes the data carried on the PDSCH, the terminal device needs to send an ACK to the network device, so that the network device determines that the terminal device successfully obtains the data carried on the PDSCH. However, if the terminal device fails to decode the data carried on the PDSCH, the terminal device needs to send a NACK to the network device, so that the network device determines that the terminal device fails to obtain the data carried on the PDSCH. If the network device receives the NACK from the terminal device, the network device determines that the terminal device fails to obtain the data carried on the PDSCH. In this case, the network device needs to schedule the terminal device to send an SRS or CSI, to retransmit the PDSCH to the terminal device based on the CSI or a result of measuring the SRS from the terminal device.

The following separately describes SRS scheduling performed by the network device and CSI scheduling performed by the network device.

1. The network device schedules the SRS.

The SRS is sent by the terminal device to the network device. The network device may determine uplink channel quality information, determine interference information of uplink transmission, or determine the uplink channel quality information and the interference information of uplink transmission by measuring the received SRS. In a TDD system, because an uplink channel and a downlink channel have reciprocity, the network device may determine downlink channel quality based on the uplink channel quality information obtained through measurement. From a perspective of a scheduling manner, the SRS may include a periodic SRS (periodic SRS, P-SRS), a semi-persistent SRS (semi-persistent SRS, SP-SRS), and an aperiodic SRS (aperiodic SRS, A-SRS). For the P-SRS, the network device may configure a time-frequency resource for the terminal device by using RRC signaling, and the terminal device sends the P-SRS to the network device once every fixed transmission periodicity by using the time-frequency resource. For the SP-SRS, the network device may activate the SP-SRS by using a MAC-CE. After the SP-SRS is activated, the terminal device also sends the SP-SRS to the network device once every fixed transmission periodicity by using a preconfigured time-frequency resource. For the A-SRS, the network device sends DCI to the terminal device, to trigger the terminal device to send the A-SRS once in a specified slot. In addition, a plurality of SRSs may be configured for one terminal device, and generally, different SRSs cannot be simultaneously sent. In one slot, an SRS generally occupies the last several symbols in the slot. For example, the SRS occupies a maximum of the last six symbols in the slot.

When the terminal device fails to decode the data carried on the PDSCH, the network device needs to schedule the retransmitted PDSCH by using DCI based on channel quality information of downlink transmission. Considering channel reciprocity, the channel quality information of downlink transmission may be approximate to the channel quality information of uplink transmission. Therefore, the network device may schedule the retransmitted PDSCH by using DCI based on the channel quality information of uplink transmission. In other words, the network device may schedule the retransmitted PDSCH by using DCI based on the result of measuring the SRS. For the P-SRS (or the SP-SRS), the time-frequency resource for carrying the P-SRS (or the SP-SRS) may be preconfigured, and is not dynamically triggered. In this way, because there are a large quantity of terminal devices, when preconfiguring the time-frequency resource for carrying the P-SRS (or the SP-SRS), the network device cannot determine a terminal device that fails in decoding. Therefore, the network device needs to configure, for all the terminal devices, the time-frequency resource for carrying the P-SRS (or the SP-SRS). To be specific, all the terminal devices each may need to send the P-SRS (or the SP-SRS) to the network device on the time-frequency resource for retransmission. Consequently, overheads for sending the P-SRS (or the SP-SRS) are excessively large, and utilization of air interface resources is reduced. For the A-SRS, when the network device determines that the terminal device fails to decode the data carried on the PDSCH, the network device needs to first send DCI to the terminal device to schedule sending of the A-SRS. After receiving the DCI, the terminal device sends the A-SRS to the network device. After receiving the A-SRS, the network device measures the A-SRS to obtain channel quality information, and then retransmits the PDSCH to the terminal device based on the channel quality information. When the network device determines that the terminal device fails to decode the data carried on the PDSCH, the network device needs to first send DCI to the terminal device to trigger the terminal device to send the A-SRS. A transmission latency of at least one slot is included from a moment at which the network device sends the DCI to a moment at which the terminal device sends the A-SRS. Because the A-SRS generally occupies the last six characters in one slot, actually, a transmission latency of at least 1.5 slots is included from the moment at which the network device sends the DCI to the moment at which the terminal device sends the A-SRS. This means that a retransmission waiting latency of at least 1.5 slots is additionally introduced, and a requirement of low-latency communication of the URLLC service is not met.

2. The network device schedules the CSI.

The network device first sends a channel state information-reference signal CSI-RS to the terminal device. After receiving the CSI-RS, the terminal device measures the CSI-RS to obtain CSI. The CSI may include a CQI, an RI, a PMI, and the like. Then, the terminal device reports the CSI to the network device through a physical uplink control channel (physical uplink control channel, PUCCH). From a perspective of a scheduling manner, the CSI may include periodic CSI (periodic CSI, P-CSI), semi-persistent CSI (semi-persistent CSI, SP-CSI), and aperiodic CSI (aperiodic CSI, A-CSI). For the P-CSI, the network device may configure a time-frequency resource for the terminal device by using RRC signaling, and the terminal device sends the P-CSI to the network device once every fixed transmission periodicity by using the time-frequency resource. For the SP-CSI, the network device may activate the SP-CSI by using a MAC-CE or DCI. After the SP-CSI is activated, the terminal device also sends the SP-CSI to the network device once every fixed transmission periodicity by using a preconfigured time-frequency resource. For the A-CSI, the network device sends DCI to the terminal device, to trigger the terminal device to send the A-CSI to the network device once on a specified PUCCH resource.

When the terminal device fails to decode the data carried on the PDSCH, the network device needs to schedule the retransmitted PDSCH by using DCI based on the CSI. For the P-CSI (or the SP-CSI), the time-frequency resource for carrying the P-CSI (or the SP-CSI) may be preconfigured by the network device, and is not dynamically triggered. In this way, there are a large quantity of terminal devices, and the network device cannot determine a terminal device that fails in decoding. Therefore, the network device needs to configure, for all the terminal devices, the time-frequency resource for carrying the P-CSI (or the SP-CSI). To be specific, all the terminal devices each need to send the P-CSI (or the SP-CSI) to the network device. Consequently, overheads for sending the P-CSI (or the SP-CSI) are excessively large, and utilization of air interface resources is reduced. For the A-CSI, when the network device determines that the terminal device fails to decode the data carried on the PDSCH, the network device needs to first send DCI to the terminal device, to schedule the terminal device to obtain the A-CSI and send the A-CSI. After receiving the DCI, the terminal device measures a specified CSI-RS to obtain the A-CSI, and then sends the A-CSI to the network device on a specified PUCCH resource in a specified slot. After receiving the A-CSI, the network device retransmits the PDSCH to the terminal device based on the A-CSI. When the network device determines that the terminal device fails to decode the data carried on the PDSCH, the network device needs to first send DCI to the terminal device, to trigger the terminal device to obtain the A-CSI and send the A-CSI to the network device. A transmission latency of at least 0.5 ms is included from a moment at which the network device sends the DCI to a moment at which the terminal device sends the A-CSI. This means that a retransmission waiting latency of at least 0.5 ms is additionally introduced, and a requirement of low-latency communication of the URLLC service is not met.

In view of this, an embodiment of this application provides a communication method. In the method, a terminal device receives a first PDSCH from a network device. When the terminal device fails to decode data (for example, data carrying a URLLC service) carried on the first PDSCH, the network device does not need to schedule sending of an SRS, the terminal device may directly send the SRS to the network device by using a first time-frequency resource, and the network device receives the SRS. In the method, after the terminal device fails in decoding, the network device does not need to schedule sending of the SRS. Therefore, a transmission latency in a process from a moment at which the terminal device fails in decoding to a moment at which the network device receives the SRS can be reduced, to meet a requirement of low-latency communication of the URLLC service.

It should be noted that this embodiment of this application is specific to SRS sending or CSI sending triggered by an event. The event may include but is not limited to that the terminal device fails to decode the data carried on the PDSCH, that the terminal device fails to receive the PDSCH, or the like. An example in which the event is that the terminal device fails to decode the data carried on the PDSCH is used below for description.

Figure 2:
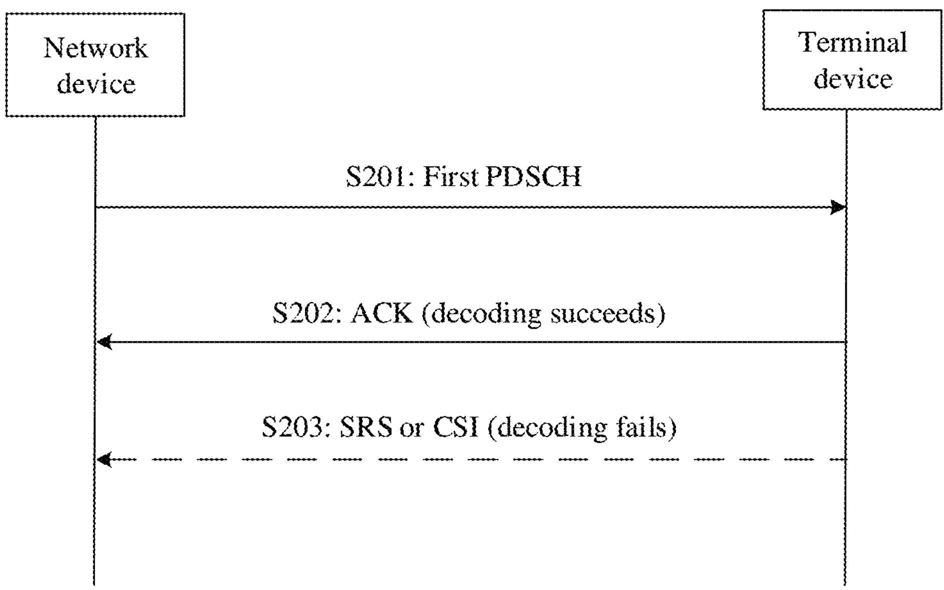
FIG. 2 is a schematic flowchart of a communication method according to an embodiment of this application.

FIG. 2 is a schematic flowchart of a communication method according to an embodiment of this application. The method may be applied to the communication system 100 shown in FIG. 1. In this embodiment of this application, a terminal device in the following content may be the terminal device 106 shown in FIG. 1, and a network device in the following content may be the network device 102 shown in FIG. 1. It should be understood that, in this embodiment of this application, a step performed by the network device may also be specifically performed by a module or a component of the network device, for example, may be performed by a chip or a chip system in the network device; a step performed by the terminal device may also be specifically performed by a module or a component of the terminal device, for example, may be performed by a chip or a chip system in the terminal device. As shown in FIG. 2, the method may include the following steps.

S201: The network device 102 sends a first PDSCH to the terminal device 106, and the terminal device 106 receives the first PDSCH.

For example, the first PDSCH may be a periodic PDSCH, or may be a dynamically scheduled PDSCH. When the first PDSCH is the periodic PDSCH, for a specific implementation process of S201, refer to S304 in Example 1, S404 in Example 2, S604 in Example 4, or S704 in Example 5 below. When the first PDSCH is the dynamically scheduled PDSCH, for a specific implementation process of S201, refer to S503 in Example 3 or S803 in Example 6 below. For example, for a specific implementation process of S201, further refer to S902 in Example 7 below.

S202: When the terminal device 106 successfully decodes data carried on the first PDSCH, the terminal device 106 sends feedback information of the first PDSCH to the network device 102, and the network device 102 receives the feedback information of the first PDSCH. Alternatively, when the terminal device 106 successfully decodes data carried on the first PDSCH, the terminal device 106 does not send feedback information of the first PDSCH to the network device 102.

For example, when the terminal device 106 successfully decodes the data carried on the first PDSCH, the feedback information that is of the first PDSCH and that is sent by the terminal device 106 to the network device may be an ACK.

For a specific implementation process of S202, refer to S306 in Example 1, S406 in Example 2, S505 in Example 3, S606 in Example 4, S706 in Example 5, or S805 in Example 6 below.

S203: When the terminal device 106 fails to decode the data carried on the first PDSCH, the terminal device 106 sends an SRS to the network device 102 on a first time-frequency resource, and the network device 102 receives the SRS. Alternatively, when the terminal device 106 fails to decode the data carried on the first PDSCH, the terminal device 106 sends CSI to the network device 102 on a second time-frequency resource, and the network device 102 receives the CSI.

For a specific implementation process of S203, refer to S307 in Example 1, S407 in Example 2, S506 in Example 3, S607 in Example 4, S707 in Example 5, or S807 in Example 6 below. For example, for a specific implementation process of S203, further refer to S904 in Example 7 or S1004 in Example 8 below.

For example, the network device 102 may determine a result of decoding the first PDSCH by the terminal device 106. For example, when the network device 102 detects the feedback information of the first PDSCH from the terminal device 106, and the feedback information is the ACK, the network device 102 may determine that the terminal device 106 correctly decodes the first PDSCH. Alternatively, when the network device 102 does not detect the feedback information of the first PDSCH from the terminal device 106, the network device 102 may determine that the terminal device 106 fails to decode the first PDSCH. Alternatively, when the network device 102 detects the feedback information of the first PDSCH from the terminal device 106, and the feedback information is a NACK, the network device 102 may determine that the terminal device 106 incorrectly decodes the first PDSCH. For another example, if the network device 102 detects the SRS from the terminal device 106 on the first time-frequency resource, the network device 106 may determine that the first PDSCH is incorrectly decoded. If the network device 102 does not detect the SRS from the terminal device 106 on the first time-frequency resource, but receives the ACK from the terminal device 106, the network device 102 may determine that the first PDSCH is correctly decoded. For a specific implementation process, refer to S308 in Example 1, S408 in Example 2, or S507 in Example 3 below. For still another example, if the network device 102 detects the CSI from the terminal device 106 on the second time-frequency resource, the network device 106 may determine that the first PDSCH is incorrectly decoded. If the network device 102 does not detect the CSI from the terminal device 106 on the second time-frequency resource, but receives the ACK from the terminal device 106, the network device 102 may determine that the first PDSCH is correctly decoded. For a specific implementation process, refer to S608 in Example 4, S708 in Example 5, or S807 in Example 6 below.

In a possible implementation, before S201, the network device 102 may further send first DCI to the terminal device 106, and the terminal device 106 receives the first DCI, where the first DCI may indicate the first time-frequency resource. For a specific implementation process, refer to S502 in Example 3 below. Alternatively, the network device 102 may further send first indication information to the terminal device 106, and the terminal device 106 receives the first indication information, where the first indication information may indicate a frequency domain resource of the first time-frequency resource. For a specific implementation process, refer to S403 in Example 2 below. Alternatively, the network device 102 may further send first configuration information to the terminal device 106, and the terminal device 106 receives the first configuration information, where the first configuration information may be used to determine a transmission periodicity of a periodic SRS and a first time-frequency resource set for carrying the periodic SRS. For a specific implementation process, refer to S303 in Example 1 below.

In another possible implementation, before S201, the network device 102 may further send third DCI to the terminal device 106, and the terminal device 106 receives the third DCI, where the third DCI may indicate the second time-frequency resource. For a specific implementation process, refer to S802 in Example 6 below. Alternatively, the network device 102 may further send second indication information to the terminal device 106, and the terminal device 106 receives the second indication information, where the second indication information may indicate a frequency domain resource of the second time-frequency resource. For a specific implementation process, refer to S703 in Example 5 below. Alternatively, the network device 102 may further send second configuration information to the terminal device 106, and the terminal device 106 receives the second configuration information, where the second configuration information may be used to determine a transmission periodicity of periodic CSI and a second time-frequency resource set for carrying the periodic CSI. For a specific implementation process, refer to S603 in Example 4 below.

The following describes in detail the communication method shown in FIG. 2 with reference to Example 1 to Example 6.

Example 1

Figure 3:
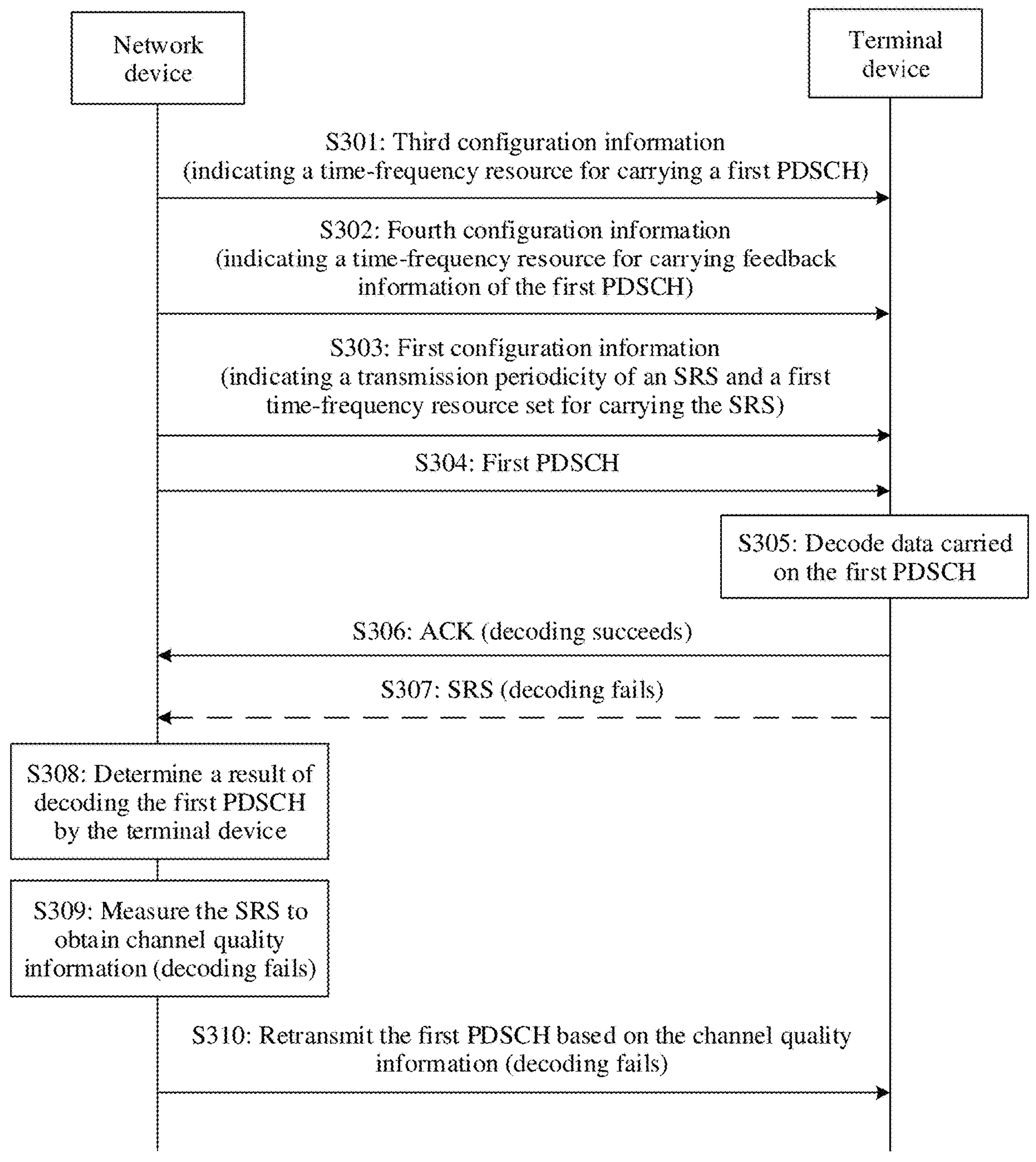
FIG. 3 is a schematic flowchart of another communication method according to an embodiment of this application.

FIG. 3 shows a communication method according to an embodiment of this application. The method may be performed by a terminal device and a network device, or may be performed by a chip in the terminal device and a chip in the network device. The network device in FIG. 3 may be the network device 102 in FIG. 1, and the terminal device may be the terminal device 106 in FIG. 1. The method shown in FIG. 3 may include the following steps.

S301: The network device 102 sends third configuration information to the terminal device 106. The terminal device 106 receives the third configuration information.

For example, the third configuration information indicates a configuration parameter carrying a first PDSCH. For example, the first PDSCH may be an SPS PDSCH, a transmission periodicity of the first PDSCH may be T1 time units, and the time unit may include but is not limited to a slot, a symbol, a subslot, a subframe, a microsecond (ms), or the like.

For example, the network device 102 may send the third configuration information to the terminal device 106 by using higher layer signaling. For example, the higher layer signaling may be RRC signaling.

For example, the network device 102 may send one piece of third configuration information to the terminal device 106. Because the third configuration information needs to be activated during initial transmission (first transmission) of the SPS PDSCH, the network device 102 may activate the third configuration information by sending DCI to the terminal device 106, to indicate a time-frequency resource for first transmission of the first PDSCH, and trigger transmission of the first PDSCH. Alternatively, the network device 102 may send a plurality of pieces of third configuration information to the terminal device 106, and may further activate one of the plurality of pieces of third configuration information by sending DCI to the terminal device 106, to indicate a time-frequency resource for first transmission of the first PDSCH, and trigger transmission of the first PDSCH.

S302: The network device 102 sends fourth configuration information to the terminal device 106. The terminal device 106 receives the fourth configuration information.

For example, the fourth configuration information indicates a time-frequency resource for carrying feedback information of the first PDSCH. For example, the feedback information of the first PDSCH may include a NACK or an ACK.

For example, time units occupied by the feedback information of the first PDSCH may be K1 time units after time units occupied by the first PDSCH, and K1 may be indicated by the network device 102 by using DCI. The time-frequency resource that is for carrying the feedback information of the first PDSCH and that is indicated by the fourth configuration information may be a time-frequency resource in the time units occupied by the feedback information of the first PDSCH.

For example, the network device 102 may further send fifth configuration information to the terminal device 106, where the fifth configuration information indicates a time-frequency resource for carrying a configured grant physical uplink shared channel (configured grant physical uplink shared channel, CG PUSCH). The terminal device 106 receives the fifth configuration information. For example, a transmission periodicity of the CG PUSCH is T2 time units, where T2 may be equal to T1. Time units occupied by the CG PUSCH may be K2 time units after the time units occupied by the first PDSCH, and K2 may be indicated by the network device 102 by using DCI.

S303: The network device 102 sends first configuration information to the terminal device 106. The terminal device 106 receives the first configuration information.

For example, the first configuration information is used to determine a transmission periodicity of an SRS and a first time-frequency resource set for carrying the SRS. For example, the transmission periodicity of the SRS is T3 time units, where T3 may be equal to T1.

For example, the network device 102 may send the first configuration information to the terminal device 106 by using higher layer signaling. Further, the network device 102 may send one or more pieces of first configuration information to the terminal device 106. When the network device 102 sends a plurality of pieces of first configuration information to the terminal device 106, the network device 102 may activate one of the plurality of pieces of first configuration information by using DCI or a MAC-CE.

The SRS in this embodiment may be a P-SRS, or may be an SP-SRS. The following uses an example in which the SRS is the P-SRS for description. The first time-frequency resource set includes a time-frequency resource for carrying the SRS. After the terminal device 106 fails to decode data carried on the first PDSCH, the terminal device 106 may determine a time-frequency resource from the first time-frequency resource set to carry the SRS. For ease of description, in this embodiment, the time-frequency resource may be referred to as a first time-frequency resource. For example, the first time-frequency resource may be the 1$^{st}$ time-frequency resource that is in the first time-frequency resource set and whose start moment is not earlier than a start moment of a symbol S1, and the symbol S1 may be the 1$^{st}$ symbol after a first time length starting from an end moment of a second time domain resource. In this embodiment, the second time domain resource may be a time domain resource occupied by the first PDSCH, or a time domain resource occupied by the feedback information of the first PDSCH. The first time length may be predefined, may be determined by using higher layer signaling, or may be specified in a protocol. For example, the first time length may be minimum sending preparation time of the SRS, minimum sending preparation time of the ACK, or a value 0.

For example, the second time domain resource is the time domain resource occupied by the first PDSCH, and the first time length may alternatively be minimum processing time from a moment at which the terminal device 106 receives a PDSCH to a moment at which the terminal device 106 sends feedback information of the PDSCH, or a sum of a second offset value and minimum processing time from a moment at which the terminal device 106 receives a PDSCH to a moment at which the terminal device 106 sends feedback information of the PDSCH. The minimum processing time from the moment at which the terminal device 106 receives the PDSCH to the moment at which the terminal device 106 sends the feedback information of the PDSCH may be predefined, configured by using higher layer signaling sent by the network device, or specified in a protocol. The second offset value may be predefined, configured by using higher layer signaling sent by the network device, or specified in a protocol.

S304: The network device 102 sends the first PDSCH to the terminal device 106. The terminal device 106 receives the first PDSCH.

Because the first PDSCH may be the SPS PDSCH, and the transmission periodicity of the first PDSCH is T1 time units, the first PDSCH may include a plurality of transmission occasions (occasions) whose periodicities each are T1 time units. In S304, the network device 102 may send the first PDSCH to the terminal device 106 on one of the plurality of transmission occasions carrying the first PDSCH.

S305: The terminal device 106 decodes the data carried on the first PDSCH.

If the terminal device 106 successfully decodes the data carried on the first PDSCH, the terminal device 106 executes content shown in S306. If the terminal device 106 fails to decode the data carried on the first PDSCH, the terminal device 106 executes content shown in S307.

For example, after receiving the first PDSCH, the terminal device 106 may demodulate and decode the data carried on the first PDSCH to obtain a decoding result, and then determine, through CRC, whether the decoding result is correct. If the decoding result passes CRC, the terminal device 106 determines that the decoding result is correct, and this means that the terminal device 106 successfully decodes the data carried on the first PDSCH. If the decoding result does not pass CRC, the terminal device 106 determines that the decoding result is incorrect, and this means that the terminal device 106 fails to decode the data carried on the first PDSCH.

S306: The terminal device 106 successfully decodes the data carried on the first PDSCH, and sends the ACK to the network device 102. The network device 102 receives the ACK. Alternatively, the terminal device 106 successfully decodes the data carried on the first PDSCH, and does not send the ACK to the network device 102.

In a possible example, after the terminal device 106 successfully decodes the data carried on the first PDSCH, the terminal device 106 may send the ACK to the network device 102 by using the time-frequency resource indicated by the fourth configuration information. Alternatively, the terminal device 106 may send the CG PUSCH to the network device 102 by using the time-frequency resource indicated by the fifth configuration information. Alternatively, the terminal device 106 may send the ACK and uplink data to the network device 102 by using the time-frequency resource indicated by the fifth configuration information. Alternatively, the terminal device 106 may respectively send the ACK and the CG PUSCH to the network device 102 by using the time-frequency resource indicated by the fourth configuration information and the time-frequency resource indicated by the fifth configuration information. In another possible example, after the terminal device 106 successfully decodes the data carried on the first PDSCH, the terminal device does not send the ACK to the network device 102, but sends the CG PUSCH to the network device 102 by using the time-frequency resource indicated by the fifth configuration information.

The transmission periodicity of the CG PUSCH is T2 time units, and the CG PUSCH may include a plurality of transmission occasions whose periodicities each are T2 time units. The terminal device 106 may send the CG PUSCH to the network device 102 on one of the plurality of transmission occasions carrying the CG PUSCH. For example, the transmission occasion carrying the CG PUSCH may be related to the transmission occasion carrying the first PDSCH in S304. In other words, a time domain resource occupied by the CG PUSCH may be related to the time domain resource occupied by the first PDSCH. For example, the time domain resource occupied by the CG PUSCH may be the 1$^{st}$ time domain resource whose start moment is not earlier than a start moment of a symbol S3, and the symbol S3 is the 1$^{st}$ symbol after a third time length starting from the end moment of the second time domain resource. The second time domain resource is the time domain resource occupied by the first PDSCH. Optionally, the second time domain resource may alternatively be the time domain resource occupied by the feedback information of the first PDSCH. The third time length may be predefined, may be determined by using higher layer signaling, or may be specified in a protocol. For example, the third time length may be minimum sending preparation time of the PUSCH, minimum sending preparation time of the ACK, or a value 0.

For example, the second time domain resource is the time domain resource occupied by the first PDSCH, and the third time length may be minimum processing time from a moment at which the terminal device 106 receives a PDSCH to a moment at which the terminal device 106 sends feedback information of the PDSCH, or a sum of a fifth offset value and minimum processing time from a moment at which the terminal device 106 receives a PDSCH to a moment at which the terminal device 106 sends feedback information of the PDSCH. The minimum processing time from the moment at which the terminal device 106 receives the PDSCH to the moment at which the terminal device 106 sends the feedback information of the PDSCH may be predefined, configured by using higher layer signaling sent by the network device, or specified in a protocol. The fifth offset value may be predefined, configured by using higher layer signaling sent by the network device, or specified in a protocol.

For example, the CG PUSCH sent by the terminal device 106 to the network device 102 and the ACK may be in a same time unit.

S307: The terminal device 106 fails to decode the data carried on the first PDSCH, and sends the SRS to the network device 102 by using the first time-frequency resource. The network device 102 receives the SRS.

For example, the terminal device 106 may determine the transmission periodicity of the SRS and the first time-frequency resource set based on the first configuration information received in S303, where the transmission periodicity of the SRS is T3 time units. Because the SRS is the P-SRS, and the SRS may include a plurality of transmission occasions whose periodicities each are T3 time units, the terminal device 106 may send the SRS to the network device 102 on one of the plurality of transmission occasions by using the first time-frequency resource. The first time-frequency resource is determined from the first time-frequency resource set. For a specific determining process, refer to the content described in S303. Details are not described herein again.

For example, the SRS sent by the terminal device 106 to the network device 102 and the NACK may be in a same time unit.

In a possible example, after the terminal device 106 fails to decode the data carried on the first PDSCH, the terminal device 106 may further send the NACK to the network device 102 by using the time-frequency resource indicated by the fourth configuration information. Alternatively, the terminal device 106 may further send the CG PUSCH to the network device 102 by using the time-frequency resource indicated by the fifth configuration information. Alternatively, the terminal device 106 may further send the uplink data and the NACK to the network device 102 by using the time-frequency resource indicated by the fifth configuration information. Alternatively, the terminal device 106 may further respectively send the NACK and the CG PUSCH to the network device 102 by using the time-frequency resource indicated by the fourth configuration information and the time-frequency resource indicated by the fifth configuration information.

In another possible example, after the terminal device 106 fails to decode the first PDSCH, the terminal device 106 may alternatively not send the NACK to the network device 102, or not send the CG PUSCH to the network device 102, or not send the NACK or the CG PUSCH to the network device 102, to reduce network overheads.

In another possible example, after failing to decode the data carried on the first PDSCH, the terminal device 106 may send the SRS to the network device 102 by using the first time-frequency resource. After successfully decoding the data carried on the first PDSCH, the terminal device 106 may not send the SRS to the network device 102 on the first time-frequency resource. Further, after successfully decoding the data carried on the first PDSCH, the terminal device 106 may alternatively not send the ACK to the network device 102, that is, not perform S306. In this way, the network device 102 may use, as a basis for determining whether the terminal device 106 successfully decodes the first PDSCH, whether the SRS is detected on the first time-frequency resource. For example, if the network device 102 detects the SRS on the first time-frequency resource, the network device 102 determines that the terminal device 106 successfully decodes the data carried on the first PDSCH. If the network device 102 does not detect the SRS on the first time-frequency resource, the network device 102 determines that the terminal device 106 fails to decode the data carried on the first PDSCH.

S308: The network device 102 determines a result of decoding the first PDSCH by the terminal device 106.

For example, if the network device 102 determines that the terminal device 106 successfully decodes the first PDSCH, the procedure ends. If the network device 102 determines that the terminal device 106 fails to decode the first PDSCH, the network device 102 performs S309.

In an example, the network device 102 may monitor the SRS (for example, perform sequence detection or energy detection) only on the first time-frequency resource, and then determine, based on whether the SRS is detected on the first time-frequency resource, the result of decoding the first PDSCH by the terminal device 106. For example, if the network device 102 detects the SRS on the first time-frequency resource, the network device 102 determines that the terminal device 106 fails to decode the first PDSCH. If the network device 102 does not detect the SRS on the first time-frequency resource, the network device 102 determines that the terminal device 106 successfully decodes the first PDSCH.

In another example, the network device 102 may respectively monitor the SRS and a HARQ-ACK on the first time-frequency resource and the time-frequency resource indicated by the fourth configuration information. For example, if the network device 102 detects the SRS on the first time-frequency resource, the network device 102 determines that the terminal device 106 fails to decode the first PDSCH. If the network device 102 detects the SRS on the first time-frequency resource, but does not detect the HARQ-ACK on the time-frequency resource indicated by the fourth configuration information, the network device 102 determines that the terminal device 106 fails to decode the first PDSCH. If the network device 102 does not detect the HARQ-ACK on the time-frequency resource indicated by the fourth configuration information, the network device 102 determines that the terminal device 106 fails to decode the first PDSCH.

In another example, the network device 102 may monitor the ACK or the NACK on the time-frequency resource indicated by the fourth configuration information. If the network device 102 detects the ACK, the network device 102 determines that the terminal device 106 successfully decodes the first PDSCH. If the network device 102 detects the NACK, the network device 102 determines that the terminal device 106 fails to decode the first PDSCH, and receives the SRS on the first time-frequency resource.

S309: The network device 102 measures the SRS to obtain channel quality information.

After determining that the terminal device 106 fails to decode the first PDSCH, the network device 102 may measure the received SRS to obtain the channel quality information, or obtain interference information, or obtain the channel quality information and the interference information.

S310: The network device 102 retransmits the first PDSCH to the terminal device 106 based on the channel quality information. Correspondingly, the terminal device 106 receives the retransmitted first PDSCH.

The network device 102 may schedule the retransmitted first PDSCH by using DCI based on the channel quality information. For example, the network device 102 may adjust a retransmission parameter of the first PDSCH based on the channel quality information, based on the interference information, or based on the channel quality information and the interference information, to increase a probability of successful retransmission of the first PDSCH and improve resource utilization, and then retransmit the first PDSCH to the terminal device 106 based on the adjusted retransmission parameter.

In the foregoing embodiment of this application, the first PDSCH is the SPS PDSCH, and the network device 102 does not need to send DCI to the terminal device 106 to schedule the first PDSCH. Therefore, overheads caused by the DCI can be reduced. After the terminal device 106 fails to decode the data carried on the first PDSCH, the terminal device 106 may send the SRS to the network device 102 by using the first time-frequency resource in the first time-frequency resource set. Therefore, a transmission latency from a moment at which the terminal device 106 fails to decode the first PDSCH to a moment at which the terminal device 106 sends the SRS to the network device 102 is reduced. In addition, the first time-frequency resource is the $1^{st}$ time-frequency resource that is in the first time-frequency resource set and whose start moment is not earlier than the start moment of the symbol S1, so that a communication latency can be further reduced.

Example 2

Figure 4:
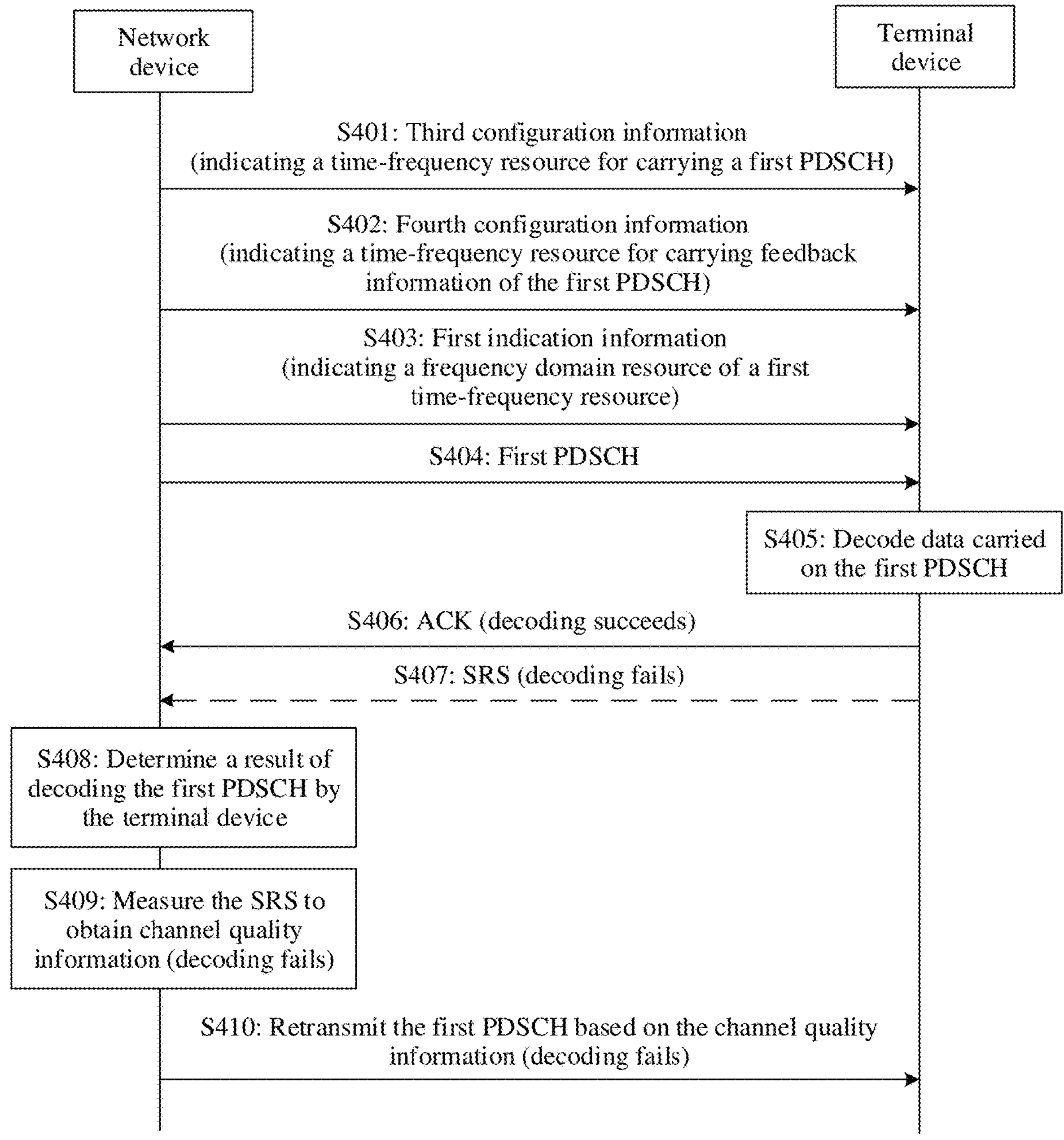
FIG. 4 is a schematic flowchart of another communication method according to an embodiment of this application.

FIG. 4 shows another communication method according to an embodiment of this application. S401, S402, and S404 to S410 are respectively the same as S301, S302, and S304 to S310 in the embodiment shown in FIG. 3, and a difference lies in the following.

S403: A network device 102 sends first indication information to a terminal device 106. The terminal device 106 receives the first indication information.

For example, the first indication information indicates a frequency domain resource of a first time-frequency resource for carrying an SRS.

For example, the network device 102 may send the first indication information to the terminal device 106 by using higher layer signaling or physical layer signaling (for example, DCI).

For ease of description, in this embodiment, a time domain resource of the first time-frequency resource may be referred to as a first time domain resource, and the frequency domain resource of the first time-frequency resource may be referred to as a first frequency domain resource.

For example, the first time domain resource is related to a second time domain resource, and the terminal device 106 may determine the first time domain resource based on the second time domain resource. Therefore, the network device 102 may indicate only the first frequency domain resource to the terminal device 106, and does not need to indicate the first time domain resource to the terminal device 106, to reduce overheads required for indicating the first time domain resource and improve resource utilization. For example, there may be a first correspondence between the first time domain resource and the second time domain resource. In this embodiment, the second time domain resource may be a time domain resource occupied by a first PDSCH, or a time domain resource occupied by feedback information of the first PDSCH.

In an example, the first correspondence between the first time domain resource and the second time domain resource may include at least one of the following correspondences: a correspondence between a start symbol of the first time domain resource and an end symbol of the second time domain resource; a correspondence between a number of a time unit in which the first time domain resource is located and a number of a time unit in which the second time domain resource is located; or a number of a time unit in which the first time domain resource is located being the same as a number of a time unit in which the second time domain resource is located.

For example, when there is a correspondence between the start symbol of the first time domain resource and the end symbol of the second time domain resource, a length of the first time domain resource may be predefined, configured by using higher layer signaling sent by the network device 102 to the terminal device 106, or specified in a protocol. For another example, when there is a correspondence between the number of the time unit in which the first time domain resource is located and the number of the time unit in which the second time domain resource is located, or the number of the time unit in which the first time domain resource is located is the same as the number of the time unit in which the second time domain resource is located, a symbol location of the first time domain resource in the time unit may be indicated by the network device 102, for example, indicated by using RRC signaling.

The correspondence between the start symbol of the first time domain resource and the end symbol of the second time domain resource may include: a distance between the start symbol of the first time domain resource and the end symbol of the second time domain resource being a first value. The first value may be predefined, configured by using higher layer signaling sent by the network device 102 to the terminal device 106, or specified in a protocol. For example, the first value may be minimum sending preparation time of the SRS, minimum sending preparation time of an ACK, or a value 0. For example, the second time domain resource is the time domain resource occupied by the first PDSCH, and the first value may alternatively be minimum processing time from a moment at which the terminal device 106 receives a PDSCH to a moment at which the terminal device 106 sends feedback information of the PDSCH, or a sum of a first offset value and minimum processing time from a moment at which the terminal device 106 receives a PDSCH to a moment at which the terminal device 106 sends feedback information of the PDSCH. The minimum processing time from the moment at which the terminal device 106 receives the PDSCH to the moment at which the terminal device 106 sends the feedback information of the PDSCH may be predefined, configured by using higher layer signaling sent by the network device 102, or specified in a protocol. The first offset value may be predefined, configured by using higher layer signaling sent by the network device 102, or specified in a protocol.

The correspondence between the number of the time unit in which the first time domain resource is located and the number of the time unit in which the second time domain resource is located may include: a difference between the number of the time unit in which the first time domain resource is located and the number of the time unit in which the second time domain resource is located being a second value. The second value may be predefined, configured by using higher layer signaling sent by the network device 102 to the terminal device 106, or specified in a protocol. For example, the second value may be minimum sending preparation time of the SRS, minimum sending preparation time of the ACK, or a value 0.

In the foregoing embodiment of this application, the first PDSCH is an SPS PDSCH, and the network device 102 does not need to send DCI to the terminal device 106 to schedule the first PDSCH. Therefore, overheads caused by the DCI can be reduced. The network device 102 may indicate only the frequency domain resource of the first time-frequency resource to the terminal device 106, and the time domain resource of the first time-frequency resource may be determined based on the first correspondence, to reduce overheads of indicating the first time domain resource to the terminal device 106 by the network device 102, improve resource utilization, and reduce a transmission latency from a moment at which the terminal device 106 fails to decode the first PDSCH to a moment at which the terminal device 106 sends the SRS to the network device 102.

Example 3

Figure 5:
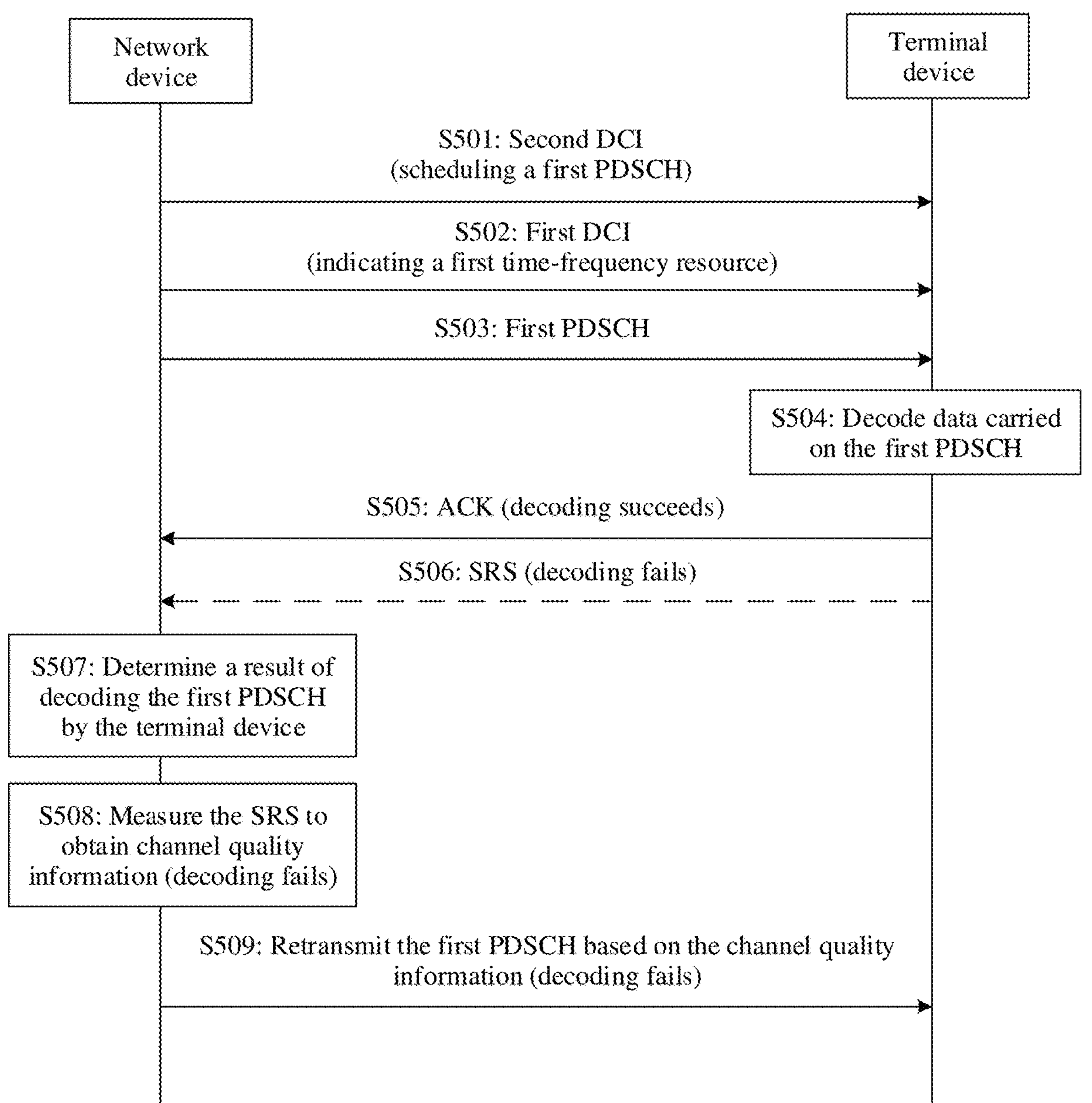
FIG. 5 is a schematic flowchart of another communication method according to an embodiment of this application.

FIG. 5 shows another communication method according to an embodiment of this application. S503, S504, and S507 to S509 are respectively the same as S304, S305, and S308 to S310 in the embodiment shown in FIG. 3, and a difference lies in the following.

S501: A network device 102 sends second DCI to a terminal device 106. The terminal device 106 receives the second DCI.

A first PDSCH is a dynamically scheduled PDSCH, and the second DCI indicates to schedule the first PDSCH, and send the first PDSCH to the terminal device 106, that is, perform content of S503.

For example, the second DCI may further indicate to schedule feedback information of the first PDSCH. In other words, the second DCI may further indicate a time-frequency resource for carrying the feedback information of the first PDSCH, for example, a slot or a PUCCH resource occupied by the feedback information of the first PDSCH. Further, time units in which the feedback information of the first PDSCH is located may be K1 time units after time units in which the first PDSCH is located. It should be understood that the network device 102 may alternatively send, to the terminal device 106, one piece of DCI used to schedule the feedback information of the first PDSCH.

S502: The network device 102 sends first DCI to the terminal device 106. The terminal device 106 receives the first DCI.

An SRS is an A-SRS, and the first DCI indicates to schedule the SRS. In other words, the first DCI indicates a first time-frequency resource for carrying the SRS.

For example, manners of S501 and S502 may be used in this application. To be specific, the network device 102 may separately send the first DCI and the second DCI to the terminal device 106, to respectively indicate to schedule the first PDSCH and the SRS. Alternatively, in this application, only one piece of DCI may be sent to the terminal device 106. The piece of DCI may indicate to schedule the first PDSCH and the SRS, or may be used to schedule the first PDSCH, the SRS, and the feedback information of the first PDSCH, or may be used to schedule the first PDSCH and the feedback information of the first PDSCH. Further, the time-frequency resource for carrying the SRS and the time-frequency resource for carrying the feedback information of the first PDSCH may be a same time-frequency resource, to improve resource utilization. For example, the terminal device 106 may send an ACK to the network device 102 by using the time-frequency resource for carrying the feedback information of the first PDSCH, and not send the SRS; send the SRS to the network device 102 by using the time-frequency resource for carrying the feedback information of the first PDSCH, and not send a NACK; or may not send an ACK or the SRS.

S505: The terminal device 106 successfully decodes data carried on the first PDSCH, and sends the ACK to the network device 102. The network device 102 receives the ACK. Alternatively, the terminal device 106 successfully decodes data carried on the first PDSCH, and does not send the ACK to the network device 102.

For example, the terminal device 106 may send the ACK to the network device 102 by using the time-frequency resource that is used to carry the feedback information of the first PDSCH and that is indicated by the second DCI, so that the network device 102 receives the ACK and determines that the terminal device 106 successfully decodes the data carried on the first PDSCH.

S506: The terminal device 106 fails to decode the data carried on the first PDSCH, and sends the SRS to the network device 102 by using the first time-frequency resource. The network device 102 receives the SRS.

The terminal device 106 may determine the first time-frequency resource based on the first DCI, and then send the SRS to the network device 102 by using the first time-frequency resource. For a determining process of the first time-frequency resource, refer to the content described in S502. Details are not described herein again.

For example, after the terminal device 106 fails to decode the data carried on the first PDSCH, the terminal device 106 may further send the NACK to the network device 102 by using the time-frequency resource that is for carrying the feedback information of the first PDSCH and that is indicated by the second DCI. Alternatively, the terminal device 106 may further send the SRS to the network device 102 by using the time-frequency resource that is for carrying the feedback information of the first PDSCH and that is indicated by the second DCI. In this case, the time-frequency resource for carrying the feedback information of the first PDSCH and the time-frequency resource for carrying the SRS are a same time-frequency resource, to improve resource utilization. Alternatively, the terminal device 106 may respectively send the SRS and the NACK to the network device 102 by using the first time-frequency resource indicated by the first DCI and the time-frequency resource that is for carrying the feedback information of the first PDSCH and that is indicated by the second DCI.

For example, after failing to decode the data carried on the first PDSCH, the terminal device 106 may send the SRS to the network device 102 by using the first time-frequency resource. After successfully decoding the data carried on the first PDSCH, the terminal device 106 may not send the SRS to the network device 102 on the first time-frequency resource. Further, after successfully decoding the data carried on the first PDSCH, the terminal device 106 may alternatively not send the ACK to the network device 102, that is, not perform S505. In this way, the network device 102 may use, as a basis for determining whether the terminal device 106 successfully decodes the first PDSCH, whether the SRS is detected on the first time-frequency resource. For example, if the network device 102 detects the SRS on the first time-frequency resource, the network device 102 determines that the terminal device 106 successfully decodes the data carried on the first PDSCH. If the network device 102 does not detect the SRS on the first time-frequency resource, the network device 102 determines that the terminal device 106 fails to decode the data carried on the first PDSCH.

In the foregoing embodiment of this application, the first PDSCH is the dynamically scheduled PDSCH, and the network device 102 needs to send DCI to the terminal device 106 to schedule the first PDSCH. Therefore, the network device 102 may respectively schedule the first PDSCH and the SRS by using two different pieces of DCI, so that after failing to decode the first PDSCH, the terminal device 106 can directly send the SRS to the network device 102 by using the first time-frequency resource, to reduce a retransmission waiting latency. Further, it is considered that the SRS is the A-SRS, and needs to be dynamically scheduled by using DCI. Therefore, in this embodiment, the network device 102 may schedule the first PDSCH and the SRS by using one piece of DCI, or implicitly schedule the SRS by using the second DCI. In this way, in addition to reducing the retransmission waiting latency, DCI overheads can be reduced, thereby improving resource utilization.

In an optional implementation, the first PDSCH sent by the network device 102 to the terminal device 106 is an SPS PDSCH, and the SRS sent by the terminal device 106 to the network device 102 is the A-SRS. In this case, in S303, the network device 102 may send the first DCI to the terminal device 106, where the first DCI indicates the first time-frequency resource for carrying the SRS. For a specific implementation process, refer to the content described in S502. In S307, when failing to decode the data carried on the first PDSCH, the terminal device 106 may send the SRS to the network device 102 by using the first time-frequency resource indicated by the first DCI, and the network device 102 receives the SRS. For a specific implementation process, refer to the content described in S506. Other steps remain unchanged. For details, refer to the foregoing description of Example 1. Details are not described herein again. In this embodiment, the first PDSCH is the SPS PDSCH, and the network device 102 does not need to send DCI to the terminal device to dynamically schedule the PDSCH. Therefore, overheads caused by the DCI can be reduced. Before sending the first PDSCH to the terminal device 106, the network device 102 may first indicate, by using the first DCI, the first time-frequency resource used to carry the A-SRS. Therefore, after failing to decode the first PDSCH, the terminal device 106 may directly send the A-SRS to the network device 102 by using the first time-frequency resource specified by the first DCI, without waiting for temporary scheduling from the network device 102, to reduce the retransmission waiting latency.

In another possible implementation, the first PDSCH sent by the network device 102 to the terminal device 106 is the dynamically scheduled PDSCH. In this case, in S502, the network device 102 may send first indication information to the terminal device 106, where the first indication information indicates a frequency domain resource of the first time-frequency resource. For a specific implementation process, refer to the content described in S403. In S506, after failing to decode the data carried on the first PDSCH, the terminal device 106 may send the SRS to the network device 102 by using the first time-frequency resource determined based on the first indication information and a first correspondence. For a specific implementation process, refer to the content described in S407. Other steps remain unchanged. For details, refer to the foregoing description of Example 3. Details are not described herein again. In this embodiment, because the first PDSCH is the dynamically scheduled PDSCH, the network device 102 may schedule the first PDSCH by using one piece of DCI, and then indicate, by using the first indication information, a frequency domain resource for carrying the SRS, so that after failing to decode the first PDSCH, the terminal device 106 can directly send the SRS to the network device 102, to reduce the retransmission waiting latency. Further, the first indication information indicates only the frequency domain resource of the first time-frequency resource, and a time domain resource of the first time-frequency resource may be determined based on the first correspondence. In addition to reducing the retransmission waiting latency, overheads of the first indication information can be further reduced, thereby improving resource utilization.

In another optional implementation, the first PDSCH sent by the network device 102 to the terminal device 106 is the dynamically scheduled PDSCH, and the SRS sent by the terminal device 106 to the network device 102 is a P-SRS or an SP-SRS. In this case, in S502, the network device 102 may send first configuration information to the terminal device 106, where the first configuration information is used to determine a transmission periodicity of the SRS and a first time-frequency resource set for carrying the SRS. For a specific implementation process, refer to the content described in S303. In S506, after failing to decode the data carried on the first PDSCH, the terminal device 106 may send the SRS to the network device 102 by using the first time-frequency resource determined from the first time-frequency resource set. For a specific implementation, refer to the content described in S307. Other steps remain unchanged. For details, refer to the foregoing description of Example 3. Details are not described herein again. In this embodiment, the first PDSCH is the dynamically scheduled PDSCH. Before sending the first PDSCH to the terminal device 106, the network device 102 may first indicate, to the terminal device, the first time-frequency resource set used to carry the P-SRS or the SP-SRS. After the terminal device 106 fails to decode the first PDSCH, the terminal device 106 may directly send the P-SRS or the SP-SRS to the network device 102, without waiting for temporary scheduling from the network device 102, to reduce the retransmission waiting latency.

The foregoing Example 1 to Example 3 describe SRS sending triggered by an event, and the following describes CSI sending triggered by an event.

Example 4

Figure 6:
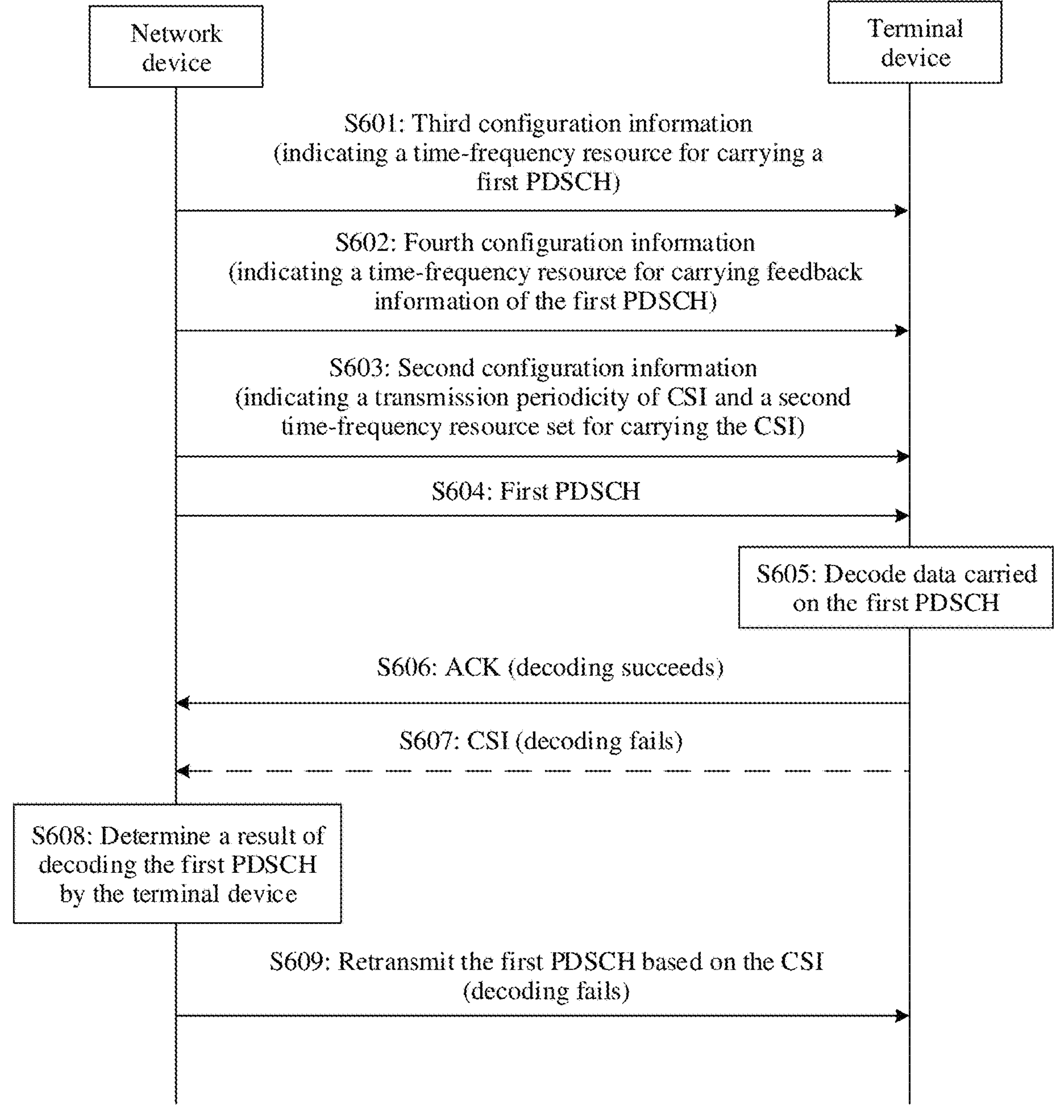
FIG. 6 is a schematic flowchart of another communication method according to an embodiment of this application.

FIG. 6 shows another communication method according to an embodiment of this application. S601, S602, and S604 to S606 are respectively the same as S301, S302, and S304 to S306 in the embodiment shown in FIG. 3, and a difference lies in the following.

S603: A network device 102 sends second configuration information to a terminal device 106. The terminal device 106 receives the second configuration information.

For example, the second configuration information is used to determine a transmission periodicity of CSI and a second time-frequency resource set for carrying the CSI. For example, the transmission periodicity of the CSI is T4 time units, where T4 may be equal to T1.

For example, the network device 102 may send the second configuration information to the terminal device 106 by using higher layer signaling. The network device 102 may send one or more pieces of second configuration information to the terminal device 106. When the network device 102 sends a plurality of pieces of second configuration information to the terminal device 106, the network device 102 may activate one of the plurality of pieces of second configuration information by using DCI or a MAC-CE.

The CSI in this embodiment may be P-CSI, or may be SP-CSI. The following uses an example in which the CSI is the P-CSI for description. The second time-frequency resource set includes a second time-frequency resource for carrying the CSI. After the terminal device 106 fails to decode data carried on a first PDSCH, the terminal device 106 may determine a time-frequency resource from the second time-frequency resource set to carry the CSI. For ease of description, in this embodiment, the time-frequency resource may be referred to as the second time-frequency resource. For example, the second time-frequency resource may be the 1st time-frequency resource that is in the second time-frequency resource set and whose start moment is not earlier than a start moment of a symbol S2, and the symbol S2 may be the 1st symbol after a second time length starting from an end moment of a second time domain resource. In this embodiment, the second time domain resource may be a time domain resource occupied by the first PDSCH, or a time domain resource occupied by feedback information of the first PDSCH. The second time length may be predefined, may be determined by using higher layer signaling, or may be specified in a protocol. For example, the second time length may be minimum sending preparation time of the CSI, minimum sending preparation time of an ACK, or a value 0.

For example, the second time domain resource is the time domain resource occupied by the first PDSCH, and the second time length may alternatively be determined by at least one of minimum processing time from a moment at which the terminal device 106 receives a PDSCH to a moment at which the terminal device 106 sends feedback information of the PDSCH, minimum processing time from a moment at which the terminal device 106 receives a CSI-RS to a moment at which the terminal device 106 sends CSI, or a fourth offset value. The minimum processing time from the moment at which the terminal device 106 receives the PDSCH to the moment at which the terminal device 106 sends the feedback information of the PDSCH may be predefined, configured by using higher layer signaling sent by the network device, or specified in a protocol. The minimum processing time from the moment at which the terminal device 106 receives the CSI-RS to the moment at which the terminal device 106 sends the CSI may be predefined, configured by using higher layer signaling sent by the network device, or specified in a protocol. The fourth offset value may be predefined, configured by using higher layer signaling sent by the network device, or specified in a protocol.

For example, the network device 102 may further send a first CSI-RS to the terminal device 106, where the first CSI-RS is used to obtain the CSI. The terminal device 106 receives the first CSI-RS. For example, the first CSI-RS may also be determined by the second configuration information.

For example, if the network device 102 sends the first CSI-RS to the terminal device 106, the second configuration information may further indicate a time-frequency resource for carrying the first CSI-RS, to reduce overheads and improve resource utilization. It should be understood that the network device 102 may alternatively indicate, to the terminal device 106, the time-frequency resource for carrying the first CSI-RS.

S607: The terminal device 106 fails to decode the data carried on the first PDSCH, and the terminal device 106 sends the CSI to the network device 102 by using the second time-frequency resource. The network device 102 receives the CSI.

For example, the terminal device 106 may obtain the CSI based on a result of measuring the first CSI-RS; obtain the CSI based on a result of measuring the data on the first PDSCH; or obtain the CSI based on a result of measuring a DMRS piggybacked on the first PDSCH.

For example, the terminal device 106 may determine the transmission periodicity of the CSI and the second time-frequency resource set based on the second configuration information received in S603. Because the CSI is the P-CSI, and the CSI may include a plurality of transmission occasions whose periodicities each are T4 time units, the terminal device 106 may send the P-CSI to the network device 102 on one of the plurality of transmission occasions by using the second time-frequency resource. The second time-frequency resource is determined from the second time-frequency resource set. For a specific determining process, refer to the content described in S603. Details are not described herein again.

For example, the CSI sent by the terminal device 106 to the network device 102 and a NACK may be in a same time unit.

In a possible example, after the terminal device 106 fails to decode the data carried on the first PDSCH, the terminal device 106 may further send the NACK to the network device 102 by using a time-frequency resource indicated by fourth configuration information. Alternatively, the terminal device 106 may further send a CG PUSCH to the network device 102 by using a time-frequency resource indicated by fifth configuration information. Alternatively, the terminal device 106 may further send the uplink data and the NACK to the network device 102 by using a time-frequency resource indicated by fifth configuration information. Alternatively, the terminal device 106 may further respectively send the NACK and a CG PUSCH to the network device 102 by using a time-frequency resource indicated by fourth configuration information and a time-frequency resource indicated by fifth configuration information.

In another possible example, after the terminal device 106 fails to decode the first PDSCH, the terminal device 106 may alternatively not send the NACK to the network device 102, or not send the CG PUSCH to the network device 102, or not send the NACK or the CG PUSCH to the network device 102, to reduce network overheads.

In another possible example, after failing to decode the data carried on the first PDSCH, the terminal device 106 may send the CSI to the network device 102 by using the second time-frequency resource. After successfully decoding the data carried on the first PDSCH, the terminal device 106 may not send the CSI to the network device 102 on the second time-frequency resource. Further, after successfully decoding the data carried on the first PDSCH, the terminal device 106 may alternatively not send the ACK to the network device 102, that is, not perform S606. In this way, the network device 102 may use, as a basis for determining whether the terminal device 106 successfully decodes the first PDSCH, whether the CSI is detected on the second time-frequency resource. For example, if the network device 102 detects the CSI on the second time-frequency resource, the network device 102 determines that the terminal device 106 fails to decode the data carried on the first PDSCH. If the network device 102 does not detect the CSI on the second time-frequency resource, the network device 102 determines that the terminal device 106 successfully decodes the data carried on the first PDSCH.

S608: The network device 102 determines a result of decoding the first PDSCH by the terminal device 106.

For example, if the network device 102 determines that the terminal device 106 successfully decodes the first PDSCH, the procedure ends; and/or if the network device 102 determines that the terminal device 106 fails to decode the first PDSCH, the network device 102 performs S609.

In an example, the network device 102 may monitor the CSI (for example, perform sequence detection or energy detection) only on the second time-frequency resource, and then determine, based on whether the CSI from the terminal device is detected on the second time-frequency resource, the result of decoding the first PDSCH by the terminal device 106. For example, if the network device 102 detects the CSI from the terminal device on the second time-frequency resource, the network device 102 determines that the terminal device 106 fails to decode the first PDSCH. If the network device 102 does not detect the CSI from the terminal device on the second time-frequency resource, the network device 102 determines that the terminal device 106 successfully decodes the first PDSCH.

In another example, the network device 102 may respectively monitor the CSI from the terminal device and a HARQ-ACK on the second time-frequency resource and the time-frequency resource indicated by the fourth configuration information. For example, if the network device 102 detects the CSI from the terminal device on the second time-frequency resource, the network device 102 determines that the terminal device 106 fails to decode the first PDSCH; and/or if the network device 102 detects the CSI from the terminal device on the second time-frequency resource, but does not detect the HARQ-ACK on the time-frequency resource indicated by the fourth configuration information, the network device 102 determines that the terminal device 106 fails to decode the first PDSCH. If the network device 102 does not detect the HARQ-ACK on the time-frequency resource indicated by the fourth configuration information, the network device 102 determines that the terminal device 106 fails to decode the first PDSCH.

In another example, the network device 102 may monitor the ACK or the NACK on the time-frequency resource indicated by the fourth configuration information. If the network device 102 detects the ACK, the network device 102 determines that the terminal device 106 successfully decodes the first PDSCH; and/or if the network device 102 detects the NACK, the network device 102 determines that the terminal device 106 fails to decode the first PDSCH, and receives the CSI from the terminal device on the second time-frequency resource.

For example, the network device 102 may determine, through sequence or energy detection, whether the CSI from the terminal device 106 is detected on the second time-frequency resource, or the network device 102 may receive the CSI on the second time-frequency resource, and perform decoding and CRC check on the CSI. For example, if the CRC check succeeds, the network device 102 determines that the CSI from the terminal device 106 is detected; if the CRC check fails, the network device 102 determines that the CSI from the terminal device 106 is not detected.

S609: The network device 102 retransmits the first PDSCH to the terminal device 106 based on the CSI. Correspondingly, the terminal device 106 receives the retransmitted first PDSCH.

The network device 102 may schedule the retransmitted first PDSCH by using DCI based on the CSI. For example, the network device 102 may adjust a retransmission parameter of the first PDSCH based on the CSI, to increase a probability of successful retransmission of the first PDSCH and improve resource utilization, and then retransmit the first PDSCH to the terminal device 106 based on the adjusted retransmission parameter.

In the foregoing embodiment of this application, the first PDSCH is an SPS PDSCH, and the network device 102 does not need to send DCI to the terminal device 106 to schedule the first PDSCH. Therefore, overheads caused by the DCI can be reduced. After the terminal device 106 fails to decode the data carried on the first PDSCH, the terminal device 106 may send the CSI to the network device 102 by using the second time-frequency resource determined from the second time-frequency resource set. Therefore, a transmission latency from a moment at which the terminal device 106 fails to decode the first PDSCH to a moment at which the terminal device 106 sends the CSI to the network device 102 is reduced. In addition, the second time-frequency resource is the 1$^{st}$ time-frequency resource that is in the second time-frequency resource set and whose start moment is not earlier than a start moment of a symbol S2, so that a communication latency can be further reduced.

Example 5

Figure 7:
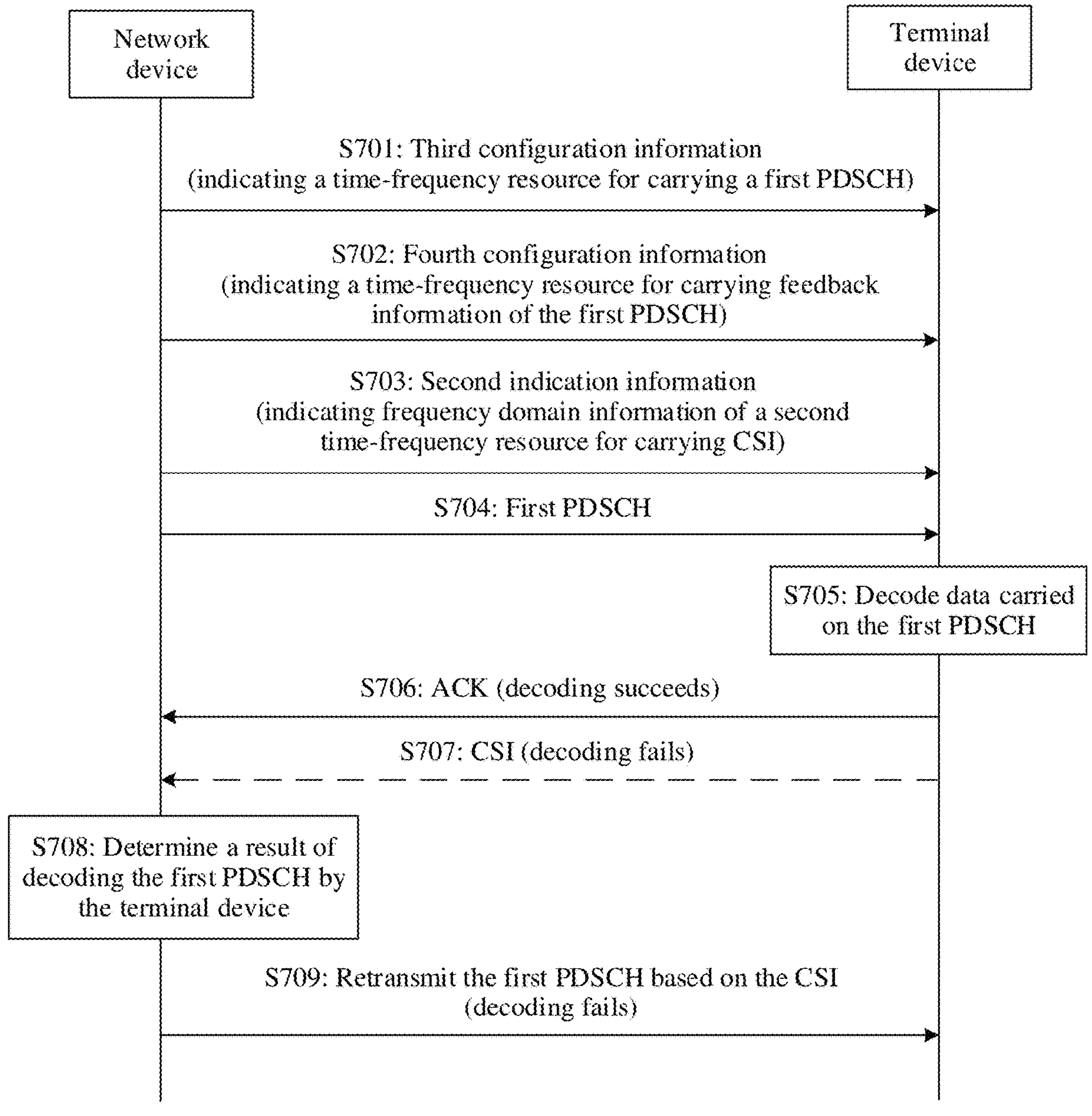
FIG. 7 is a schematic flowchart of another communication method according to an embodiment of this application.

FIG. 7 shows another communication method according to an embodiment of this application. S701, S702, and S704 to S709 are respectively the same as S601, S602, and S604 to S609 in the embodiment shown in FIG. 6, and a difference lies in the following.

S703: A network device 102 sends second indication information to a terminal device 106. The terminal device 106 receives the second indication information.

For example, the second indication information indicates a frequency domain resource of a second time-frequency resource for carrying CSI.

For example, the network device 102 may send the second indication information to the terminal device 106 by using higher layer signaling or physical layer signaling.

For ease of description, in this embodiment, a time domain resource of the second time-frequency resource may be referred to as a third time domain resource, and the frequency domain resource of the second time-frequency resource may be referred to as a third frequency domain resource.

For example, the third time domain resource is related to a second time domain resource, and the terminal device 106 may determine the third time domain resource based on the second time domain resource. Therefore, the network device 102 may indicate only the third frequency domain resource to the terminal device 106, and does not need to indicate the third time domain resource to the terminal device 106, to reduce overheads required for indicating the third time domain resource and improve resource utilization. For example, there may be a second correspondence between the third time domain resource and the second time domain resource. A length of the third time domain resource may be predefined, configured by using higher layer signaling sent by the network device 102 to the terminal device 106, or specified in a protocol. In this embodiment, the second time domain resource may be a time domain resource occupied by a first PDSCH, or a time domain resource occupied by feedback information of the first PDSCH.

In an example, the second correspondence may include at least one of the following correspondences: a correspondence between a start symbol of the third time domain resource and an end symbol of the second time domain resource; a correspondence between a number of a time unit in which the third time domain resource is located and a number of a time unit in which the second time domain resource is located; or a number of a time unit in which the third time domain resource is located being the same as a number of a time unit in which the second time domain resource is located. Further, the number of the time unit in which the third time domain resource is located is the same as the number of the time unit in which the second time domain resource is located, and a symbol location of the third time domain resource in the time unit may be indicated by the network device 102, for example, indicated by using RRC signaling.

The correspondence between the start symbol of the third time domain resource and the end symbol of the second time domain resource may include: a distance between the start symbol of the third time domain resource and the end symbol of the second time domain resource being a third value. The first value may be predefined, configured by using higher layer signaling sent by the network device 102 to the terminal device 106, or specified in a protocol. For example, the second time domain resource is the time domain resource occupied by the first PDSCH, and the third value may be determined by at least one of minimum processing time from a moment at which the terminal device receives a PDSCH to a moment at which the terminal device sends corresponding feedback information, minimum processing time from a moment at which the terminal device receives a CSI-RS to a moment at which the terminal device sends CSI, or a third offset value. For example, the third value may be the minimum processing time from the moment at which the terminal device receives the PDSCH to the moment at which the terminal device sends the corresponding feedback information. Alternatively, the third value may be a sum of the third offset value and the minimum processing time from the moment at which the terminal device receives the CSI-RS to the moment at which the terminal device sends the CSI. Alternatively, the third value may be a sum of the third offset value and the minimum processing time from the moment at which the terminal device receives the PDSCH to the moment at which the terminal device sends the corresponding feedback information. The minimum processing time from the moment at which the terminal device receives the PDSCH to the moment at which the terminal device sends the corresponding feedback information may be predefined, configured by using higher layer signaling, or specified in a protocol. The minimum processing time from the moment at which the terminal device receives the CSI-RS to the moment at which the terminal device sends the CSI may be predefined, configured by using higher layer signaling, or specified in a protocol. The third offset value may be predefined, configured by using higher layer signaling, or specified in a protocol. Further, the distance between the start symbol of the third time domain resource and the end symbol of the second time domain resource is the third value, and the length of the third time domain resource may alternatively be indicated by the network device 102, for example, indicated by using higher layer signaling.

The correspondence between the number of the time unit in which the third time domain resource is located and the number of the time unit in which the second time domain resource is located may include: a difference between the number of the time unit in which the third time domain resource is located and the number of the time unit in which the second time domain resource is located being a fourth value. The fourth value may be predefined, configured by using higher layer signaling sent by the network device 102 to the terminal device 106, or specified in a protocol.

In the foregoing embodiment of this application, the first PDSCH is an SPS PDSCH, and the network device 102 does not need to send DCI to the terminal device 106 to schedule the first PDSCH. Therefore, overheads caused by the DCI can be reduced. The network device 102 may indicate only the second indication information to the terminal device 106, where the second indication information indicates the frequency domain resource of the second time-frequency resource, and the time domain resource of the second time-frequency resource may be determined based on the second correspondence, to reduce overheads of indicating the third time domain resource to the terminal device 106 by the network device 102, improve resource utilization, and reduce a transmission latency from a moment at which the terminal device 106 fails to decode the first PDSCH to a moment at which the terminal device 106 sends the CSI to the network device 102.

Example 6

Figure 8:
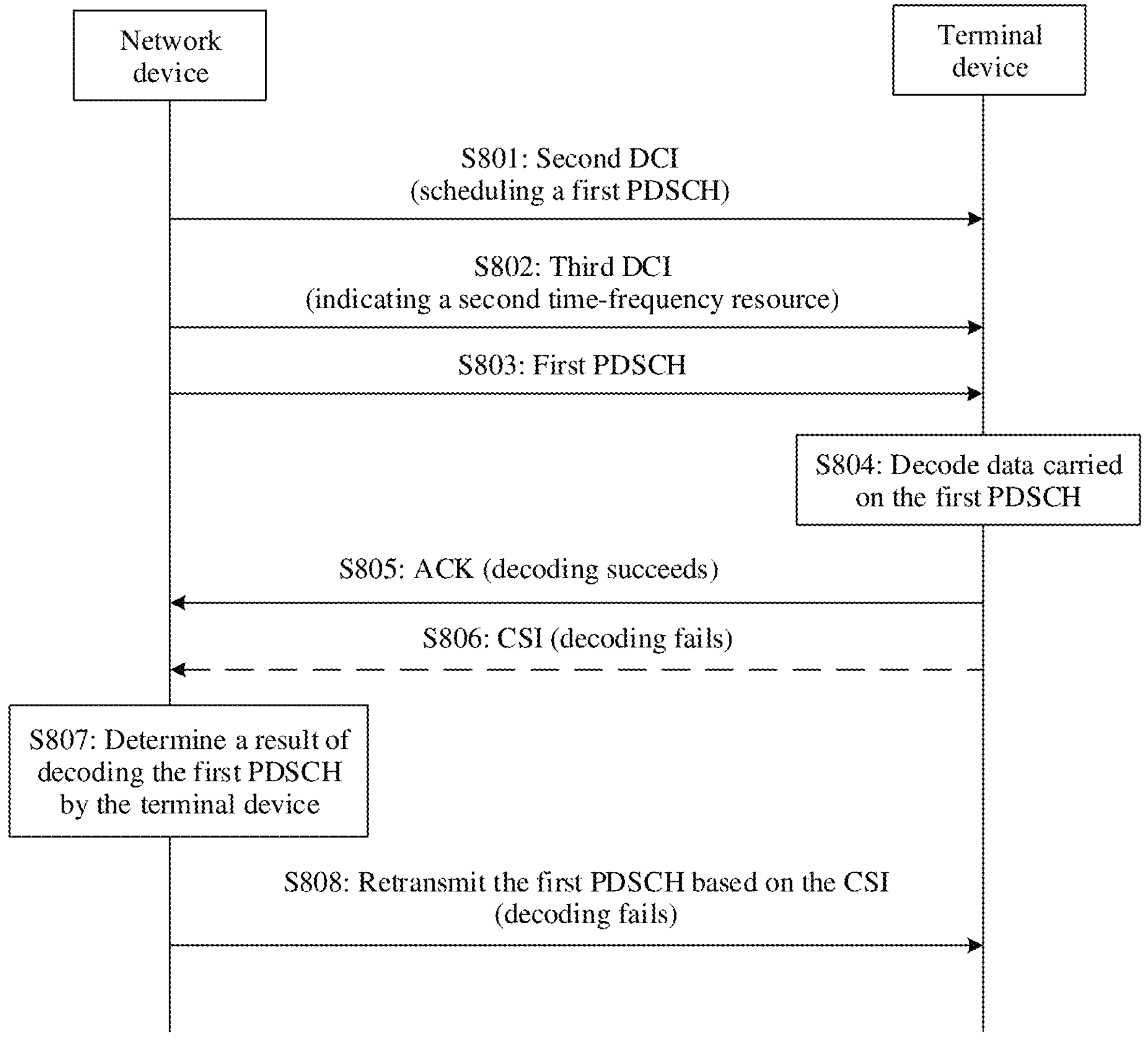
FIG. 8 is a schematic flowchart of another communication method according to an embodiment of this application.

FIG. 8 shows another communication method according to an embodiment of this application. S803 to S805, S807, and S808 are respectively the same as S604 to S606, S608, and S609 in the embodiment shown in FIG. 6, and a difference lies in the following.

S801: A network device 102 sends second DCI to a terminal device 106. The terminal device 106 receives the second DCI.

S801 is the same as S501 in the embodiment shown in FIG. 5. Details are not described herein again.

S802: The network device 102 sends third DCI to the terminal device 106. The terminal device 106 receives the third DCI.

CSI is A-CSI, and the third DCI indicates to schedule the CSI. In other words, the third DCI indicates a second time-frequency resource for carrying the CSI.

For example, manners of S801 and S802 may be used in this application. To be specific, the network device 102 may separately send the second DCI and the third DCI to the terminal device 106, to respectively indicate to schedule a first PDSCH and the CSI. Alternatively, in this application, only one piece of DCI may be sent to the terminal device 106. The piece of DCI may indicate to schedule the first PDSCH and the CSI, or may indicate to schedule the first PDSCH, the CSI, and feedback information of the first PDSCH, or may indicate to schedule the first PDSCH and the feedback information of the first PDSCH. Further, the time-frequency resource for carrying the CSI and a time-frequency resource for carrying the feedback information of the first PDSCH may be a same time-frequency resource, to improve resource utilization. For example, the terminal device 106 may send an ACK to the network device 102 by using the time-frequency resource for carrying the feedback information of the first PDSCH, and not send the CSI; and/or may send the CSI to the network device 102 by using the time-frequency resource for carrying the feedback information of the first PDSCH, and not send a NACK. For another example, the terminal device 106 may not send an ACK or the CSI; and/or may send the CSI to the network device 102 by using the time-frequency resource for carrying the feedback information of the first PDSCH, and not send a NACK.

S806: The terminal device 106 fails to decode data carried on the first PDSCH, and the terminal device 106 sends the CSI to the network device 102 by using the second time-frequency resource. The network device 102 receives the CSI.

The terminal device 106 may determine the second time-frequency resource based on the third DCI, and then send the CSI to the network device 102 by using the second time-frequency resource. For a determining process of the second time-frequency resource, refer to the content described in S802. Details are not described herein again.

For example, after the terminal device 106 fails to decode the data carried on the first PDSCH, the terminal device 106 may further send the NACK to the network device 102 by using the time-frequency resource that is for carrying the feedback information of the first PDSCH and that is indicated by the second DCI. Alternatively, the terminal device 106 may send the CSI to the network device 102 by using the time-frequency resource that is for carrying the feedback information of the first PDSCH and that is indicated by the second DCI. In this case, the time-frequency resource for carrying the feedback information of the first PDSCH and the time-frequency resource for carrying the CSI are a same time-frequency resource, to improve resource utilization. Alternatively, the terminal device 106 may respectively send the CSI and the NACK to the network device 102 by using the second time-frequency resource indicated by the third DCI and the time-frequency resource that is for carrying the feedback information of the first PDSCH and that is indicated by the second DCI.

For example, after failing to decode the data carried on the first PDSCH, the terminal device 106 may send the CSI to the network device 102 by using the second time-frequency resource. After successfully decoding the data carried on the first PDSCH, the terminal device 106 may not send the CSI to the network device 102 on the second time-frequency resource. Further, after successfully decoding the data carried on the first PDSCH, the terminal device 106 may alternatively not send the ACK to the network device 102, that is, not perform S805. In this way, the network device 102 may use, as a basis for determining whether the terminal device 106 successfully decodes the first PDSCH, whether the CSI is detected on the second time-frequency resource. For example, if the network device 102 detects the CSI on the second time-frequency resource, the network device 102 determines that the terminal device 106 successfully decodes the data carried on the first PDSCH. If the network device 102 does not detect the CSI on the second time-frequency resource, the network device 102 determines that the terminal device 106 fails to decode the data carried on the first PDSCH.

In the foregoing embodiment of this application, the first PDSCH is a dynamically scheduled PDSCH, and the network device 102 needs to send DCI to the terminal device 106 to schedule the first PDSCH. Therefore, the network device 102 may respectively schedule the first PDSCH and the CSI by using two different pieces of DCI, so that after failing to decode the first PDSCH, the terminal device 106 can directly send the CSI to the network device 102 by using the second time-frequency resource, to reduce a retransmission waiting latency. Further, it is considered that the CSI is A-CSI, and needs to be dynamically scheduled by using DCI. Therefore, in this embodiment, the network device 102 may schedule the first PDSCH and the CSI by using one piece of DCI, or implicitly schedule the CSI by using the second DCI. In this way, in addition to reducing the retransmission waiting latency, DCI overheads can be reduced, thereby improving resource utilization.

In an optional implementation, the first PDSCH sent by the network device 102 to the terminal device 106 is an SPS PDSCH, and the CSI sent by the terminal device 106 to the network device 102 is the A-CSI. In this case, in S603, the network device 102 may send the third DCI to the terminal device 106, where the third DCI indicates the second time-frequency resource for carrying the CSI. For a specific implementation process, refer to the content described in S802. In S607, when failing to decode the data carried on the first PDSCH, the terminal device 106 may send the CSI to the network device 102 by using the second time-frequency resource indicated by the third DCI, and the network device 102 receives the CSI. For a specific implementation process, refer to the content described in S806. Other steps remain unchanged. For details, refer to the foregoing description of Example 4. Details are not described herein again. In this embodiment, the first PDSCH is the SPS PDSCH, and the network device 102 does not need to send DCI to the terminal device 106 to dynamically schedule the PDSCH. Therefore, overheads caused by the DCI can be reduced. The CSI sent by the terminal device 106 to the network device 102 is the A-CSI, and before sending the first PDSCH to the terminal device 106, the network device 102 may first indicate, by using the third DCI, the second time-frequency resource used to carry the A-CSI. Therefore, after failing to decode the first PDSCH, the terminal device 106 may directly send the A-CSI to the network device 102 by using the second time-frequency resource specified by the third DCI, without waiting for temporary scheduling from the network device 102, to reduce the retransmission waiting latency.

In another possible implementation, the first PDSCH sent by the network device 102 to the terminal device 106 is the dynamically scheduled PDSCH. In this case, in S802, the network device 102 may send second indication information to the terminal device 106, where the second indication information indicates a frequency domain resource of the second time-frequency resource. For a specific implementation process, refer to the content described in S703. In S806, after failing to decode the data carried on the first PDSCH, the terminal device 106 may send the CSI to the network device 102 by using the second time-frequency resource determined based on the second indication information and a second correspondence. For a specific implementation process, refer to the content described in S707. Other steps remain unchanged. For details, refer to the foregoing description of Example 6. Details are not described herein again. In this embodiment, because the first PDSCH is the dynamically scheduled PDSCH, the network device 102 may schedule the first PDSCH by using one piece of DCI, and then indicate, by using the second indication information, the time-frequency resource for carrying the CSI, so that after failing to decode the first PDSCH, the terminal device 106 can directly send the CSI to the network device 102, to reduce the retransmission waiting latency. Further, the second indication information may indicate only the frequency domain resource of the second time-frequency resource, and a time domain resource of the second time-frequency resource may be determined based on the second correspondence. In addition to reducing the retransmission waiting latency, overheads of the second indication information can be further reduced, thereby improving resource utilization.

In another optional implementation, the first PDSCH sent by the network device 102 to the terminal device 106 is the dynamically scheduled PDSCH, and the CSI sent by the terminal device 106 to the network device 102 is P-CSI or SP-CSI. In this case, in S802, the network device 102 may send second configuration information to the terminal device 106, where the second configuration information is used to determine a transmission periodicity of the CSI and a second time-frequency resource set for carrying the CSI. For a specific implementation process, refer to the content described in S603. In S806, after failing to decode the data carried on the first PDSCH, the terminal device 106 may send the CSI to the network device 102 by using the second time-frequency resource determined from the second time-frequency resource set, and the network device 102 receives the CSI. For a specific implementation, refer to the content described in S607. Other steps remain unchanged. For details, refer to the foregoing description of Example 6. Details are not described herein again. In this embodiment, the first PDSCH is the dynamically scheduled PDSCH. Before sending the first PDSCH to the terminal device 106, the network device 102 may first indicate, by using higher layer signaling, the second time-frequency resource set used to carry the P-CSI or the SP-CSI. Therefore, after the terminal device 106 fails to decode the first PDSCH, the terminal device 106 may directly send the P-CSI or the SP-CSI to the network device 102 by using the second time-frequency resource in the second time-frequency resource set, without waiting for temporary scheduling from the network device 102, to reduce the retransmission waiting latency.

Example 7

Figure 9:
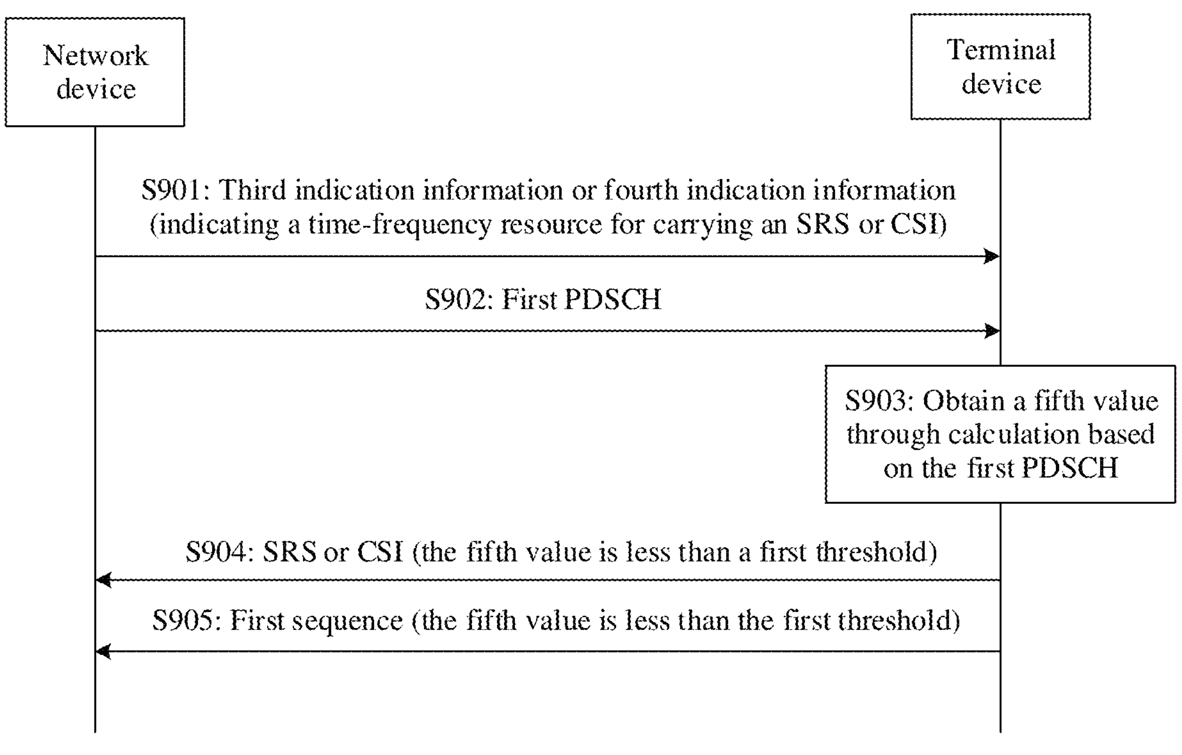
FIG. 9 is a schematic flowchart of another communication method according to an embodiment of this application.

FIG. 9 shows a communication method according to an embodiment of this application. The method may be performed by a terminal device and a network device, or may be performed by a chip in the terminal device and a chip in the network device. The network device in FIG. 9 may be the network device 102 in FIG. 1, and the terminal device may be the terminal device 106 in FIG. 1. The method shown in FIG. 9 may include the following steps.

S901: The network device 102 sends third indication information or fourth indication information to the terminal device 106. Correspondingly, the terminal device 106 receives the third indication information or the fourth indication information.

For example, the third indication information may indicate a fourth time-frequency resource, and the fourth time-frequency resource is used to carry an SRS or CSI. The third indication information may include at least one of RRC signaling, a MAC-CE, or DCI. For example, when the SRS is an aperiodic SRS or the CSI is aperiodic CSI, the third indication information may be the DCI. For example, when the third indication information is the DCI, the third indication information may be further used to schedule a first PDSCH. For another example, when the SRS is a periodic SRS or the CSI is periodic CSI, the third indication information may be the RRC signaling or the MAC-CE.

For ease of description, in this embodiment, a frequency domain resource of the fourth time-frequency resource may be referred to as a fourth frequency domain resource, and a time domain resource of the fourth time-frequency resource may be referred to as a fourth time domain resource.

For example, the fourth indication information may indicate the fourth frequency domain resource. The fourth time domain resource is related to a fifth time domain resource. For example, there is a third correspondence between the fourth time domain resource and the fifth time domain resource. The terminal device 106 may determine the fourth time domain resource based on the third correspondence and the fifth time domain resource, and may obtain the fourth time-frequency resource with reference to the fourth frequency domain resource indicated by the fourth indication information. The third correspondence may be predefined or indicated by the network device 102, and the fifth time domain resource may be a time domain resource of the fifth time-frequency resource or a time domain resource for carrying feedback information of the first PDSCH.

For example, the third correspondence may further include at least one of the following: when the fifth time domain resource is the time domain resource of the fifth time-frequency resource, a start symbol of the fourth time domain resource may be the $1^{st}$ symbol not earlier than a symbol S4, where the symbol S4 may be the $1^{st}$ symbol after a fourth time length starting from an end location of the fifth time domain resource, and the fourth time length may be predefined, or configured by the network device 102 by using higher layer signaling. When the fifth time domain resource is the time domain resource for carrying the feedback information of the first PDSCH, a time unit in which the fourth time domain resource is located may be the same as a time unit in which the fifth time domain resource is located, and a symbol location of the fourth time domain resource in the time unit may be predefined or indicated by the network device.

S902: The network device 102 sends the first PDSCH to the terminal device 106, and the terminal device 106 receives the first PDSCH.

For example, the first PDSCH may be an SPS PDSCH, or may be a dynamically scheduled PDSCH, for example, a PDSCH dynamically scheduled by using second DCI.

For example, the network device 102 may send the first PDSCH to the terminal device 106 on a third time-frequency resource, and the terminal device 106 receives the first PDSCH on the third time-frequency resource.

S903: The terminal device 106 obtains a fifth value through calculation based on the first PDSCH.

For example, if the fifth value is less than a first threshold, the terminal device 106 performs content described in S904; and/or if the fifth value is greater than or equal to a first threshold, the procedure ends, to be specific, the terminal device 106 does not send the SRS or the CSI to the network device on the fourth time-frequency resource.

For example, the terminal device 106 may obtain the fifth value through calculation based on a result of measuring data on the first PDSCH and/or a result of measuring a DMRS piggybacked on the first PDSCH. The fifth value may represent a receiving capability of the terminal device 106 to receive a signal on the fifth time-frequency resource. The fifth time-frequency resource may be a part or all of the third time-frequency resource. For example, the fifth time-frequency resource may be equal to the third time-frequency resource.

In a possible example, the fifth value may be an SINR obtained by the terminal device 106 by measuring the data on the first PDSCH and/or the DMRS piggybacked on the first PDSCH. The SINR may be obtained by the terminal device 106 by calculating an SINR of one or more data streams on the first PDSCH, obtained by the terminal device 106 by calculating an SINR of one or more DMRS ports piggybacked on the first PDSCH, or obtained by the terminal device 106 by calculating the SINR of one or more data streams of the data of the first PDSCH and the SINR of one or more DMRS ports piggybacked on the first PDSCH.

In another possible example, the fifth value may be a probability that the terminal device 106 successfully receives a part or all of the first PDSCH on the fifth time-frequency resource. The probability is not a probability of whether decoding is correct after the terminal device 106 completes receiving of the first PDSCH, but is a probability of successful decoding that is determined by the terminal device 106 before decoding. For example, the probability may be a probability that the data is successfully received and that is determined based on an SINR, where the SINR is obtained by the terminal device 106 by measuring the DMRS piggybacked on the first PDSCH and/or the data of the first PDSCH. For another example, the probability may be a probability that the data is successfully received and that is determined based on a likelihood ratio value, where the likelihood ratio value is obtained by the terminal device 106 by calculating each encoded bit of the first PDSCH on the fifth time-frequency resource, and a likelihood ratio value on one bit represents a logarithmic value of a ratio of a probability of sending 1 by the network device 102 on the bit to a probability of sending 0.

In another possible example, the fifth value may be a first CQI index. The first CQI index may be a largest CQI index that meets a first condition, and the first condition may be that a bit error rate of receiving data by the terminal device 106 on a sixth time-frequency resource does not exceed a sixth value. The sixth time-frequency resource may be predefined or indicated by the network device 102. For example, the sixth time-frequency resource may be the fifth time-frequency resource. The sixth value may be predefined or indicated by the network device 102. For example, the sixth value is 0.1 or 0.00001.

In another possible example, the terminal device 106 may further determine an RI and/or a PMI. The RI may be predefined or indicated by the network device. For example, the RI may be a quantity of ports of the first PDSCH and/or a quantity of DMRS ports piggybacked on the first PDSCH. The PMI may be predefined or indicated by the network device. For example, the PMI may be an identity matrix.

S904: The terminal device 106 sends first information to the network device 102 on the fourth time-frequency resource, and the network device 102 receives the first information.

For example, the first information may include the SRS or the CSI. For a determining process of the fourth time-frequency resource, refer to the content described in S901. Details are not described herein again.

S905: The terminal device 106 sends a first sequence to the network device 102, and the network device 102 receives the first sequence.

For example, the terminal device 106 may send the first sequence to the network device 102 on a seventh time-frequency resource.

For example, the seventh time-frequency resource may be a part or all of the fourth time-frequency resource. An ID of the terminal device 106 may be used to determine a time-frequency location of the seventh time-frequency resource, and/or used to determine the first sequence. In this manner, if a plurality of terminal devices reuse a same time-frequency location to send respective SRSs or CSI to the network device, the network device may determine, by performing terminal device blind detection at the time-frequency location, an ID of a terminal device that sends the first sequence, to complete SRS or CSI receiving on the fourth time-frequency resource. For example, the network device may determine, by monitoring the first sequence (for example, an initialization ID or an initial cyclic shift of the first sequence), the ID of the terminal device that sends the first sequence. For another example, the network device may determine, by monitoring a time-frequency resource location of the first sequence, the ID of the terminal device that sends the first sequence.

For example, the first sequence may be an SRS sequence or a DMRS sequence of the CSI. It should be understood that when the first sequence is the SRS and the first information is the SRS, S904 and S905 are a same step.

In the foregoing embodiment, the terminal device 106 receives the first PDSCH, and determines, based on receiving quality of the first PDSCH, whether to send the SRS or the CSI. When the receiving quality of the first PDSCH is poor, the terminal device 106 sends the SRS or the CSI to the network device 102, so that the network device 102 obtains and updates channel information or interference information of the terminal device 106. In this way, the network device 102 may adjust, in time, a transmission parameter for subsequent data transmission with the terminal device. This avoids a problem that subsequent transmission fails because the channel information or the interference information is not updated in time. In addition, because the terminal device 106 sends the SRS or the CSI to the network device 102 only when channel receiving quality is poor, a probability that a single terminal device sends the SRS or the CSI is reduced, and a plurality of terminal devices may reuse a same time-frequency location to send respective SRSs or CSI to the network device 102, to reduce overheads of air interface resources for sending the SRSs or the CSI.

Example 8

Figure 10:
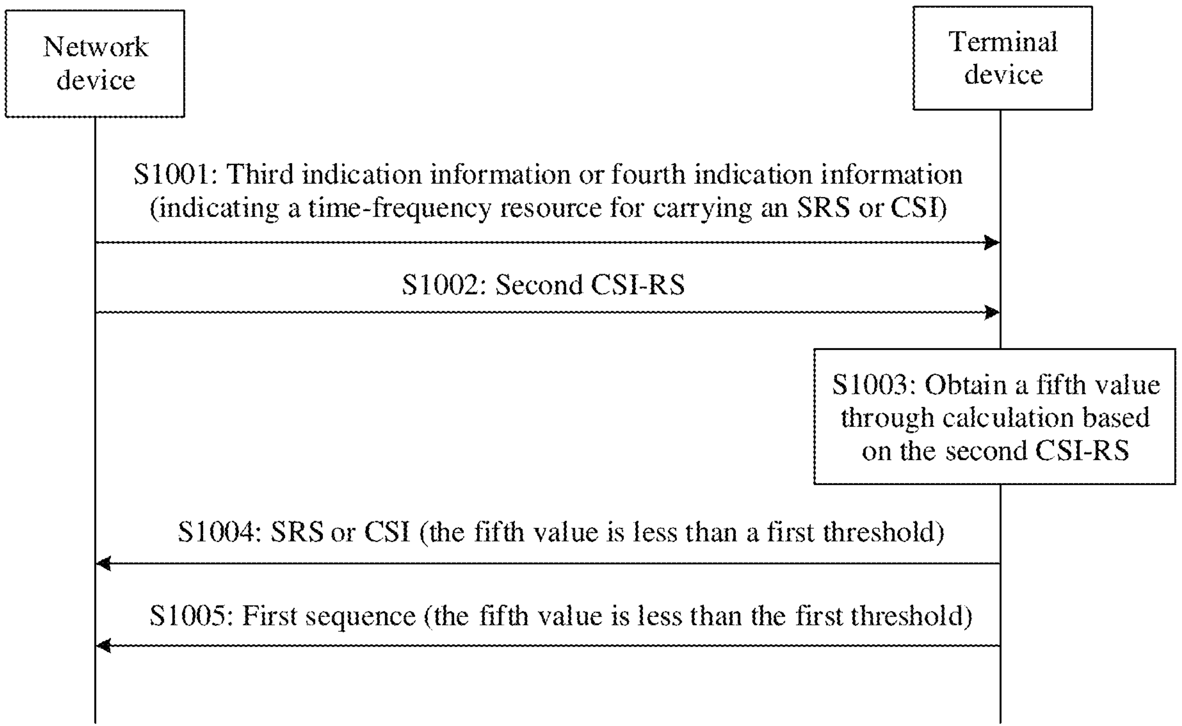
FIG. 10 is a schematic flowchart of another communication method according to an embodiment of this application.

FIG. 10 shows another communication method according to an embodiment of this application. S1001, S1004, and S1005 are respectively the same as S901, S904, and S1005 in the embodiment shown in FIG. 9, and a difference lies in the following.

S1002: A network device 102 sends a second CSI-RS to a terminal device 106, and the terminal device 106 receives the second CSI-RS.

For example, the network device 102 may send the second CSI-RS to the terminal device 106 on an eighth time-frequency resource. The second CSI-RS may be used to determine a fifth value.

S1003: The terminal device 106 obtains the fifth value through calculation based on a result of measuring a first CSI-RS.

For example, if the fifth value is less than a first threshold, the terminal device 106 performs content shown in S1004; and/or if the fifth value is greater than or equal to a first threshold, the procedure ends, to be specific, the terminal device 106 does not send an SRS or CSI to the network device 102 on a fourth time-frequency resource.

For example, the terminal device 106 may obtain the fifth value through calculation based on the result of measuring the second CSI-RS. For example, the fifth value may be a first CQI index obtained by the terminal device 106 through calculation based on measurement of the first CSI-RS. The first CQI index may be a largest CQI index that meets a first condition, and the first condition may be that a bit error rate of receiving data by the terminal device 106 on a sixth time-frequency resource does not exceed a sixth value. The sixth time-frequency resource may be predefined or indicated by the network device 102. For example, the sixth time-frequency resource may be a fifth time-frequency resource. The sixth value may be predefined or indicated by the network device 102. For example, the sixth value is 0.1 or 0.00001.

For example, the terminal device 106 may further determine an RI and/or a PMI. The RI may be predefined or indicated by the network device. The PMI may be predefined or indicated by the network device.

In the foregoing embodiment, the terminal device 106 receives the second CSI-RS, and determines, based on receiving quality of the second CSI-RS, whether to send the SRS or the CSI. When the receiving quality of the second CSI-RS is poor, the terminal device 106 sends the SRS or the CSI to the network device 102, so that the network device 102 obtains and updates channel information or interference information of the terminal device 106. In this way, the network device 102 may adjust, in time, a transmission parameter for subsequent data transmission with the terminal device. This avoids a problem that subsequent transmission fails because the channel information or the interference information is not updated in time. In addition, because the terminal device 106 sends the SRS or the CSI to the network device 102 only when channel receiving quality is poor, a probability that a single terminal device sends the SRS or the CSI is reduced, and a plurality of terminal devices may reuse a same time-frequency location to send respective SRSs or CSI to the network device 102, to reduce overheads of air interface resources for sending the SRSs or the CSI.

Figure 11:
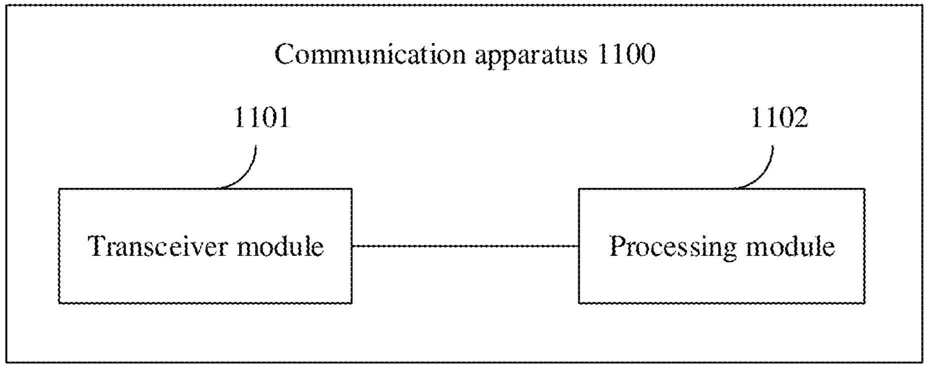
FIG. 11 is a schematic diagram of a structure of a communication apparatus according to an embodiment of this application.
Figure 12:
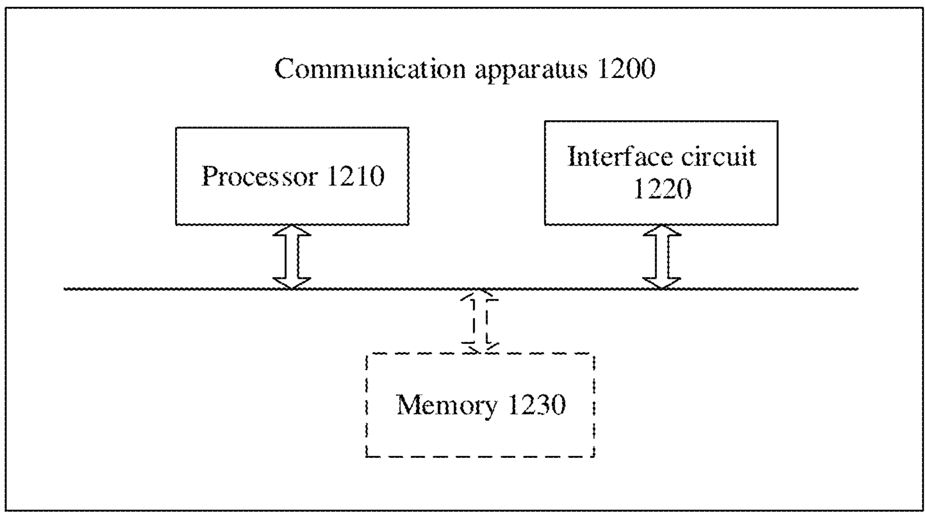
FIG. 12 is a schematic diagram of a structure of another communication apparatus according to an embodiment of this application.

FIG. 11 and FIG. 12 each are a schematic diagram of a structure of a possible communication apparatus according to an embodiment of this application. The communication apparatuses may implement the functions of the terminal device or the network device in the foregoing method embodiments. Therefore, beneficial effects of the foregoing method embodiments can also be implemented. In this embodiment of this application, the communication apparatus may be the terminal device 106 shown in FIG. 1, or may be the network device 102 shown in FIG. 1, or may be a module (for example, a chip or a chip system) used in the terminal device or the network device.

As shown in FIG. 11, the communication apparatus 1100 includes a transceiver module 1101 and a processing module 1102. The communication apparatus 1100 may be configured to implement the function of the terminal device or the network device in the method embodiment shown in any one of FIG. 2 to FIG. 10.

For example, when the communication apparatus 1100 is configured to implement the function of the terminal device in the method embodiment in FIG. 2, the transceiver module 1101 may be configured to receive a first PDSCH from the network device. The processing module 1102 may be configured to: after the first PDSCH is successfully decoded, control the transceiver module 1101 to send an ACK to the network device or skip sending the ACK to the network device. The processing module 1102 may be further configured to: after the first PDSCH fails to be decoded, control the transceiver module 1101 to send an SRS to the network device by using a first time-frequency resource, or send CSI to the network device by using a second time-frequency resource.

For example, when the communication apparatus 1100 is configured to implement the function of the network device in the method embodiment in FIG. 2, the transceiver module 1101 may be configured to send a first PDSCH to the terminal device. The transceiver module 1101 may be further configured to receive an ACK, an SRS, or CSI from the terminal device. The processing module 1102 may be configured to: when the SRS is detected on a first time-frequency resource or the CSI is detected on a second time-frequency resource, determine that the first PDSCH is not correctly decoded. The processing module 1102 may be further configured to: when the SRS is not detected on the first time-frequency resource or the CSI is not detected on the second time-frequency resource, determine that the first PDSCH is correctly decoded.

For example, when the communication apparatus 1100 is configured to implement the function of the terminal device in the method embodiment in FIG. 3, FIG. 4, FIG. 6, or FIG. 7, the transceiver module 1101 may be configured to receive third configuration information, fourth configuration information, and a first PDSCH from the network device, where the third configuration information indicates a time-frequency resource for carrying the first PDSCH, and the fourth configuration information indicates a time-frequency resource for carrying feedback information of the first PDSCH. The transceiver module 1101 is further configured to receive fifth configuration information from the network device, where the fifth configuration information indicates a time-frequency resource for carrying a CG PDSCH. The processing module 1102 is configured to decode data carried on the first PDSCH. The processing module 1102 is further configured to: after successfully decoding the first PDSCH, control the transceiver module 1101 to send an ACK to the network device or skip sending the ACK to the network device. The processing module 1102 is further configured to: after the first PDSCH fails to be decoded, control the transceiver module 1101 to send an SRS to the network device or send CSI to the network device, and further send a NACK to the network device.

Further, when the communication apparatus 1100 is configured to implement the function of the terminal device in the method embodiment shown in FIG. 3 or FIG. 6, the transceiver module 1101 is specifically configured to receive first configuration information or second configuration information from the network device, where the first configuration information indicates a first time-frequency resource for carrying an SRS, and the second configuration information indicates a second time-frequency resource for carrying CSI. The processing module 1102 is specifically configured to obtain the first time-frequency resource based on the first configuration information, or obtain the second time-frequency resource based on the second configuration information. When the communication apparatus 1100 is configured to implement the function of the terminal device in the method embodiment shown in FIG. 4 or FIG. 7, the transceiver module 1101 is specifically configured to receive first indication information or second indication information from the network device, where the first indication information indicates a frequency domain resource of a first time-frequency resource, and the second indication information indicates a frequency domain resource of a second time-frequency resource. The processing module 1102 is specifically configured to determine the first time-frequency resource based on the first indication information and a first correspondence, or determine the second time-frequency resource based on the second indication information and a second correspondence.

For example, when the communication apparatus 1100 is configured to implement the function of the network device in the method embodiment in FIG. 3, FIG. 4, FIG. 6, or FIG. 7, the transceiver module 1101 may be configured to send third configuration information, fourth configuration information, and a first PDSCH to the terminal device, where the third configuration information indicates a time-frequency resource for carrying the first PDSCH, and the fourth configuration information indicates a time-frequency resource for carrying feedback information of the first PDSCH. The transceiver module 1101 is further configured to send fifth configuration information to the terminal device, where the fifth configuration information indicates a time-frequency resource for carrying a CG PDSCH. The transceiver module 1101 is further configured to: after the terminal device fails to decode the first PDSCH, receive an SRS or CSI from the terminal device. The processing module 1102 is configured to determine a result of decoding the first PDSCH by the terminal device. The processing module 1102 is further configured to: after determining that the terminal device fails to decode the first PDSCH, control the transceiver module 1101 to retransmit the first PDSCH to the terminal device.

Further, when the communication apparatus 1100 is configured to implement the function of the network device in the method embodiment in FIG. 3 or FIG. 6, the transceiver module 1101 is specifically configured to send first configuration information or second configuration information to the terminal device, where the first configuration information indicates a first time-frequency resource for carrying an SRS, and the second configuration information indicates a second time-frequency resource for carrying CSI. When the communication apparatus 1100 is configured to implement the function of the terminal device in the method embodiment in FIG. 4 or FIG. 7, the transceiver module 1101 is specifically configured to send first indication information or second indication information to the terminal device, where the first indication information indicates a frequency domain resource of a first time-frequency resource, and the second indication information indicates a frequency domain resource of a second time-frequency resource.

For example, when the communication apparatus 1100 is configured to implement the function of the terminal device in the method embodiment in FIG. 5 or FIG. 8, the transceiver module 1101 is configured to receive second DCI and a first PDSCH of the network device, where the second DCI is used to schedule the first PDSCH and/or feedback information of the first PDSCH. The processing module 1102 is configured to decode data carried on the first PDSCH. The processing module 1102 is further configured to: after the first PDSCH is successfully decoded, control the transceiver module 1101 to send an ACK to the network device or skip sending the ACK to the network device. The processing module 1102 is further configured to: after the first PDSCH fails to be decoded, control the transceiver module 1101 to send an SRS to the network device or send CSI to the network device, and further send a NACK to the network device.

Further, when the communication apparatus 1100 is configured to implement the function of the terminal device in the method embodiment in FIG. 5, the transceiver module 1101 is specifically configured to receive first DCI from the network device, where the first DCI is used to schedule an SRS. The processing module 1102 is specifically configured to determine a first time-frequency resource based on the first DCI. When the communication apparatus 1100 is configured to implement the function of the terminal device in the method embodiment in FIG. 8, the transceiver module 1101 is specifically configured to receive third DCI from the network device, where the third DCI is used to schedule CSI. The processing module 1102 is specifically configured to determine a second time-frequency resource based on the third DCI.

For example, when the communication apparatus 1100 is configured to implement the function of the network device in the method embodiment in FIG. 5 or FIG. 8, the transceiver module 1101 is configured to send second DCI and a first PDSCH to the terminal device, where the second DCI is used to schedule the first PDSCH and/or feedback information of the first PDSCH. The processing module 1102 is configured to determine a result of decoding the first PDSCH by the terminal device. The processing module 1102 is further configured to: after determining that the terminal device fails to decode the first PDSCH, control the transceiver module 1101 to retransmit the first PDSCH to the terminal device.

Further, when the communication apparatus 1100 is configured to implement the function of the network device in the method embodiment in FIG. 5, the transceiver module 1101 is specifically configured to send first DCI to the terminal device, where the first DCI is used to schedule an SRS. When the communication apparatus 1100 is configured to implement the function of the terminal device in the method embodiment in FIG. 8, the transceiver module 1101 is specifically configured to send third DCI to the terminal device, where the third DCI is used to schedule an SRS.

For example, when the communication apparatus 1100 is configured to implement the function of the terminal device in the method embodiment in FIG. 9 or FIG. 10, the transceiver module 1101 is configured to receive third indication information or fourth indication information from the network device. The processing module 1102 is configured to: when a fifth value is less than a first threshold, control the transceiver module 1101 to send an SRS or CSI to the network device.

Further, when the communication apparatus 1100 is configured to implement the function of the terminal device in the method embodiment in FIG. 9, the transceiver module 1101 is specifically configured to receive a first PDSCH from the network device. The processing module 1102 is specifically configured to obtain a fifth value through calculation based on the first PDSCH. When the communication apparatus 1100 is configured to implement the function of the terminal device in the method embodiment in FIG. 10, the transceiver module 1101 is specifically configured to receive a second CSI-RS from the network device. The processing module 1102 is specifically configured to obtain a fifth value through calculation based on the second CSI-RS.

For example, when the communication apparatus 1100 is configured to implement the function of the network device in the method embodiment in FIG. 9 or FIG. 10, the transceiver module 1101 is configured to send third indication information or fourth indication information to the terminal device. The processing module 1102 is configured to: when a fifth value is less than a first threshold, control the transceiver module 1101 to receive an SRS or CSI from the terminal device.

Further, when the communication apparatus 1100 is configured to implement the function of the network device in the method embodiment in FIG. 9, the transceiver module 1101 is specifically configured to send a first PDSCH to the terminal device. When the communication apparatus 1100 is configured to implement the function of the network device in the method embodiment in FIG. 10, the transceiver module 1101 is specifically configured to send a second CSI-RS to the terminal device.

For more detailed descriptions of the transceiver module 1101 and the processing module 1102, refer to related descriptions in the foregoing method embodiments. Details are not described herein again.

As shown in FIG. 12, the communication apparatus 1200 includes a processor 1210 and an interface circuit 1220. The processor 1210 and the interface circuit 1220 are coupled to each other. It may be understood that the interface circuit 1220 may be a transceiver or an input/output interface. Optionally, the communication apparatus 1200 may further include a memory 1230, configured to store instructions executed by the processor 1210, or store input data required by the processor 1210 to run the instructions, or store data generated after the processor 1210 runs the instructions.

When the communication apparatus 1200 is configured to implement the method in the foregoing method embodiment, the processor 1210 may be configured to perform a function of the processing module 1102, and the interface circuit 1220 may be configured to perform a function of the transceiver module 1101.

When the communication apparatus is a chip used in a terminal device, the chip used in the terminal device implements the function of the terminal device in the foregoing method embodiment. The chip used in the terminal device receives information from another module (for example, a radio frequency module or an antenna) in the terminal device, where the information is sent by a network device to the terminal device. Alternatively, the chip used in the terminal device sends information to another module (for example, a radio frequency module or an antenna) in the terminal device, where the information is sent by the terminal device to a network device.

When the communication apparatus is a chip used in a network device, the chip used in the network device implements the function of the network device in the foregoing method embodiment. The chip used in the network device receives information from another module (for example, a radio frequency module or an antenna) in the network device, where the information is sent by a terminal device to the network device. Alternatively, the chip used in the network device sends information to another module (for example, a radio frequency module or an antenna) in the network device, where the information is sent by the network device to a terminal device.

It may be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA), another programmable logic device, a transistor logic device, a hardware component, or any combination thereof. The general-purpose processor may be a microprocessor or any conventional processor.

The method steps in embodiments of this application may be implemented in a hardware manner or may be implemented in a manner of executing software instructions by a processor. The software instructions may include a corresponding software module. The software module may be stored in a random access memory (random access memory, RAM), a flash memory, a read-only memory (Read-Only Memory, ROM), a programmable read only memory (programmable ROM, PROM), an erasable programmable read only memory (erasable PROM, EPROM), an electrically erasable programmable read only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may further be a component of the processor. The processor and the storage medium may be located in the ASIC. In addition, the ASIC may be located in an access network device or a terminal device. Certainly, the processor and the storage medium may exist in the access network device or the terminal device as discrete components.

All or some of the foregoing embodiments may be implemented by software, hardware, firmware, or any combination thereof. When software is used to implement embodiments, all or some of embodiments may be implemented in a form of a computer program product. The computer program product includes one or more computer programs or instructions. When the computer programs or instructions are loaded and executed on the computer, the procedures or functions according to embodiments of this application are all or partially generated. The computer may be a general-purpose computer, a dedicated computer, a computer network, or another programmable apparatus. The computer programs or instructions may be stored in a computer-readable storage medium, or may be transmitted by using the computer-readable storage medium. The computer-readable storage medium may be any usable medium accessible by a computer, or a data storage device, such as a server, integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (solid-state drive, SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

What is claimed is:

1. A communication method, comprising:

receiving, by a terminal device, a first physical downlink shared channel (PDSCH) from a network device;

decoding, by the terminal device, data carried on the first PDSCH to obtain a decoding result;

determining, by the terminal device whether the result of the decoding of the data carried on the first PDSCH is correct;

based on determining the result of the decoding of the data carried on the first PDSCH is not correct, reducing a transmission latency by directly sending by the terminal device a sounding reference signal (SRS) to the network device on a first time-frequency resource without waiting for scheduling from the network device to reduce time from unsuccessfully decoding the first PDSCH to a time the SRS is sent to the network device by the terminal device, and receiving, by the terminal device, a retransmission of the first PDSCH from the network device using an adjusted retransmission parameter of the first PDSCH based on a result of a measurement of the SRS sent without waiting on rescheduling from the network device; and based on determining the result of the decoding of the data carried on the first PDSCH is correct, sending by the terminal device feedback information of the first PDSCH to the network device, wherein the feedback information includes acknowledgement information.

2. The method according to claim 1, in response to the data carried on the first PDSCH being successfully decoded by the terminal device, the method further comprises:

skipping sending, by the terminal device, the SRS to the network device on the first time-frequency resource.

3. The method according to claim 1, wherein the SRS is an aperiodic SRS, and the method further comprises:

receiving, by the terminal device, first downlink control information (DCI) from the network device, wherein the first DCI indicates the first time-frequency resource.

4. The method according to claim 3, further comprising using, by the terminal device, the first DCI to schedule the first PDSCH.

5. The method according to claim 1, wherein the first time-frequency resource is the same as a time-frequency resource used to carry the feedback information of the first PDSCH.

6. The method according to claim 1, wherein the method further comprises:

receiving, by the terminal device, first indication information from the network device, wherein the first indication information indicates a frequency domain resource of the first time-frequency resource; and determining, by the terminal device, a first time domain resource, wherein the first time domain resource is a time domain resource of the first time-frequency resource, and there is a first correspondence between the first time domain resource and a second time domain resource, wherein the second time domain resource is a time domain resource occupied by the first PDSCH, a time domain resource occupied by the feedback information of the first PDSCH, or a time domain resource occupied by a second Downlink Control Information (DCI), and using, by the terminal device, the second DCI to schedule the first PDSCH.

7. The method according to claim 1, wherein the SRS is a periodic SRS, and the method further comprises:

receiving, by the terminal device, first configuration information from the network device, using, by the terminal device, the first configuration information to determine a transmission periodicity of the periodic SRS and a first time-frequency resource set for carrying the periodic SRS, the first time-frequency resource is in the first time-frequency resource set and whose start moment is not earlier than a start moment of a symbol S1, and the symbol S1 is the 1st symbol after a first time length starting from an end moment of a second time domain resource, wherein the second time domain resource is a time domain resource occupied by the first PDSCH, a time domain resource occupied by the feedback information of the first PDSCH, or a time domain resource occupied by a second Downlink Control Information (DCI), and using, by the terminal device, the second DCI to schedule the first PDSCH.

8. A communication method, comprising:

sending, by a network device, a first physical downlink shared channel (PDSCH) to a terminal device for decoding by the terminal device to determine, by the terminal device, whether a result of the decoding of data carried on the first PDSCH is correct;

based the result of the decoding of the data carried on the first PDSCH being determined not to be correct, receiving, by the network device, feedback information of the first PDSCH from the terminal device, and the feedback information being negative acknowledgement information, and receiving, by the network device, a sounding reference signal (SRS) directly sent from the terminal device on a first time-frequency resource without waiting for scheduling from the network device to reduce time from unsuccessfully decoding the first PDSCH to a time the SRS is sent to the network device, and sending, by the network device, a retransmission of the first PDSCH to the terminal device using an adjusted retransmission parameter of the first PDSCH based on a result of a measurement of the SRS sent without waiting on rescheduling from the network device; and based the result of the decoding of the data carried on the first PDSCH being determined not to be correct, not receiving, by the network device, the feedback information of the first PDSCH from the terminal device, and receiving, by the network device, the SRS directly sent from the terminal device on the first time-frequency resource without waiting for the scheduling from the network device.

9. The method according to claim 8, wherein the SRS is an aperiodic SRS, and the method further comprises:

sending, by the network device, first downlink control information (DCI) to the terminal device, wherein the first DCI indicates the first time-frequency resource.

10. The method according to claim 9, wherein further comprising using, by the network device, the first DCI to schedule the first PDSCH.

11. The method according to claim 8, wherein the first time-frequency resource is the same as a time-frequency resource used to carry the feedback information of the first PDSCH.

12. The method according to claim 8, wherein the method further comprises:

sending, by the network device, first indication information to the terminal device, wherein the first indication information indicates a frequency domain resource of the first time-frequency resource; and determining, by the network device, a first time domain resource, wherein the first time domain resource is a time domain resource of the first time-frequency resource, and there is a first correspondence between the first time domain resource and a second time domain resource, wherein the second time domain resource is a time domain resource occupied by the first PDSCH, a time domain resource occupied by the feedback information of the first PDSCH, or a time domain resource occupied by a second Downlink Control Information (DCI), and using, by the network device, the second DCI to schedule the first PDSCH.

13. A communication apparatus, comprising:

a memory, configured to store a computer program or instructions;

a processor, connected to the memory; and a transceiver, configured to receive a first physical downlink shared channel (PDSCH) from a network device;

wherein the processor is configured to execute computer-readable instructions to:

receive, via the transceiver, a first physical downlink shared channel (PDSCH) from a network device, decode data carried on the first PDSCH to obtain a decoding result, determine whether the result of the decoding of the data carried on the first PDSCH is correct, reduce a transmission latency by directly sending, via the transceiver, a sounding reference signal (SRS) to the network device on a first time-frequency resource without waiting for scheduling from the network device to reduce time from unsuccessfully decoding the first PDSCH to a time the SRS is sent to the network device, and receive a retransmission of the first PDSCH from the network device using an adjusted retransmission parameter of the first PDSCH based on a result of a measurement of the SRS sent without waiting on rescheduling from the network device; and send, via the transceiver, feedback information of the first PDSCH to the network device in response to the result of the decoding by the processor of the data carried on the first PDSCH by the processor is correct, wherein the feedback information includes acknowledgement information.

14. The apparatus according to claim 13, in response to the data carried on the first PDSCH being successfully decoded, the processor is configured to:

skip sending the SRS to the network device on the first time-frequency resource.

15. The apparatus according to claim 13, wherein the SRS is an aperiodic SRS, and the processor further configured to:

receive, via the transceiver, first downlink control information (DCI) from the network device, wherein the first DCI indicates the first time-frequency resource.

16. The apparatus according to claim 13, wherein the processor is further configured to:

receive, via the transceiver, first indication information from the network device, wherein the first indication information indicates a frequency domain resource of the first time-frequency resource; and determine a first time domain resource, wherein the first time domain resource is a time domain resource of the first time-frequency resource, and there is a first correspondence between the first time domain resource and a second time domain resource, wherein the second time domain resource is a time domain resource occupied by the first PDSCH, a time domain resource occupied by the feedback information of the first PDSCH, or a time domain resource occupied by a second Downlink Control Information (DCI), and the processor is further configured to use the second DCI to schedule the first PDSCH.

17. A communication apparatus, comprising:

a memory, configured to store a computer program or instructions;

a processor coupled to the memory; and a transceiver; configured to send a first physical downlink shared channel (PDSCH) to a terminal device; and wherein the processor is configured to execute the computer program or instructions to:

receive, via the transceiver, a first physical downlink shared channel (PDSCH) from a network device, decode data carried on the first PDSCH to obtain a decoding result, determine whether the result of the decoding of the data carried on the first PDSCH is correct, directly receive, via the transceiver, a sounding reference signal (SRS) sent from the terminal device on a first time-frequency resource without the terminal device waiting for scheduling on a first time-frequency resource to reduce time from unsuccessfully decoding the first PDSCH to a time the SRS is sent by the terminal device, and in response to feedback information of the first PDSCH being received from the terminal device indicating the result of the decoding by the terminal device of the data on the first PDSCH is determined to not be correct, the feedback information is negative acknowledgement information; and configured to receive the SRS from the terminal device on the first time-frequency resource in response to the feedback information of the first PDSCH not being received from the terminal device indicating the terminal device determined the result of the decoding of the data carried on the first PDSCH is incorrect.

18. The apparatus according to claim 17, wherein the SRS is an aperiodic SRS, and the processor is further configured to:

send, via the transceiver, first downlink control information (DCI) to the terminal device, wherein the first DCI indicates the first time-frequency resource.

19. The apparatus according to claim 17, wherein the first time-frequency resource is the same as a time-frequency resource used to carry the feedback information of the first PDSCH.

20. The apparatus according to claim 17, wherein the processor is further configured to:

send, via the transceiver, first indication information to the terminal device, wherein the first indication information indicates a frequency domain resource of the first time-frequency resource; and determine a first time domain resource, wherein the first time domain resource is a time domain resource of the first time-frequency resource, and there is a first correspondence between the first time domain resource and a second time domain resource, wherein the second time domain resource is a time domain resource occupied by the first PDSCH, a time domain resource occupied by the feedback information of the first PDSCH, or a time domain resource occupied by a second Downlink Control Information (DCI), and the processor is configured to use the second DCI to schedule the first PDSCH.

* * * * *